US010344650B2

(12) United States Patent
Skulason

(10) Patent No.: US 10,344,650 B2
(45) Date of Patent: Jul. 9, 2019

(54) ELECTROLYTIC PRODUCTION OF AMMONIA

(71) Applicant: HÁSKÓLI ÍSLANDS, Reykjavik (IS)

(72) Inventor: Egill Skulason, Reykjavik (IS)

(73) Assignee: HASKOLI ISLANDS, Reykjavik (IS)

( * ) Notice: Subject to any disclaimer, the term of this patent is extended or adjusted under 35 U.S.C. 154(b) by 201 days.

(21) Appl. No.: 15/318,525

(22) PCT Filed: Jun. 12, 2015

(86) PCT No.: PCT/IS2015/050012
§ 371 (c)(1),
(2) Date: Dec. 13, 2016

(87) PCT Pub. No.: WO2015/189865
PCT Pub. Date: Dec. 17, 2015

(65) Prior Publication Data
US 2017/0122173 A1 May 4, 2017

(30) Foreign Application Priority Data

Jun. 13, 2014 (IS) .......................... 050086

(51) Int. Cl.
C25B 1/00 (2006.01)
F01N 3/20 (2006.01)
(Continued)

(52) U.S. Cl.
CPC ........... *F01N 3/2073* (2013.01); *B01D 53/50* (2013.01); *B01D 53/56* (2013.01); *B01D 53/92* (2013.01);
(Continued)

(58) Field of Classification Search
CPC ... F01N 3/2073; F01N 2610/02; B01D 53/56; B01D 53/92; B01D 53/50; C01C 1/0494;
(Continued)

(56) References Cited

U.S. PATENT DOCUMENTS 3,416,891 A 12/1968 Roubin et al.
6,881,308 B2 4/2005 Denvir et al.
(Continued)

FOREIGN PATENT DOCUMENTS

CH 395036 A 7/1965
DE 1948183 A1 4/1971
(Continued)

OTHER PUBLICATIONS

Abghoui et al., "Enabling Electrochemical Reduction of Nitrogen to Ammonia at Ambient Conditions Through Rational Catalyst Design", Physical Chemistry Chemical Physics, vol. 17, 2015, pp. 4909-4918.

(Continued)

*Primary Examiner* — Arun S Phasge
(74) *Attorney, Agent, or Firm* — Workman Nydegger

(57) ABSTRACT

A process and system for electrolytic production ammonia. The process comprises feeding gaseous nitrogen to an electrolytic cell, where it comes in contact with a cathode electrode surface, wherein said surface has a catalyst surface comprising a nitride catalyst, said electrolytic cell comprising a proton donor, and running a current through said electrolytic cell, whereby nitrogen reacts with protons to form ammonia. The process and system of the invention uses an electrochemical cell with a cathode surface having a catalytic surface which is preferably charged with one or more of Vanadium nitride, Chromium nitride, Zirconium nitride, Niobium nitride, Iron nitride or Osmium nitride.

19 Claims, 13 Drawing Sheets

(51) Int. Cl.
  C25B 11/00    (2006.01)
  C25B 11/04    (2006.01)
  B01D 53/50    (2006.01)
  B01D 53/56    (2006.01)
  B01D 53/92    (2006.01)
  C01C 1/04     (2006.01)

(52) U.S. Cl.
  CPC .............. *C01C 1/0494* (2013.01); *C25B 1/00* (2013.01); *C25B 11/00* (2013.01); *C25B 11/04* (2013.01); *C25B 11/0447* (2013.01); *F01N 2610/02* (2013.01)

(58) Field of Classification Search
  CPC ..... C25B 11/04; C25B 11/00; C25B 11/0447; C25B 1/00; Y02A 50/2344
  See application file for complete search history.

(56) References Cited

U.S. PATENT DOCUMENTS

2011/0243823 A1* 10/2011 Botte ................ C25B 1/00 423/235
2013/0281285 A1    10/2013 Kotaro et al.

FOREIGN PATENT DOCUMENTS

| | | |
|---|---|---|
| GB | 1191846 A | 5/1970 |
| JP | 2001096163 A | 4/2001 |
| JP | 2001239163 A | 9/2001 |
| JP | 2005272856 A | 10/2005 |
| JP | 2008013435 A | 1/2008 |

OTHER PUBLICATIONS

Amar et al., "Electrochemical Synthesis of Ammonia Based on a Carbonate-Oxide Composite Electrolyte", Solid State Ionics, vol. 182, 2011, pp. 133-138.

Baker et al., "Ancient Boomerangs Discovered in South Australia", Nature, vol. 253, Jan. 3, 1975, 2 Pages.

Howalt et al., "DFT Based Study of Transition Metal Nano-Clusters for Electrochemical NH3 Production", Physical Chemistry Chemical Physics, 2013, 11 Pages.

Howalt et al., "Electrochemical Ammonia Production on Molybdenum Nitride Nanoclusters", Physical Chemistry Chemical Physics, Oct. 2, 2013, 26 Pages.

Howalt et al., "The Role of Oxygen and Water on Molybdenum Nanoclusters for Electro Catalytic Ammonia Production", Downloaded on Jul. 26, 2017.

International Search Report from PCT Application No. PCT/IS2015/050012, dated Sep. 4, 2015.

Danish Search Report from Application No. 050086/SE201401411, dated Jan. 2013.

Kordali et al., "Electrochemical Synthesis of Ammonia at Atmospheric Pressure and Low Temperature in a Solid Polymer Electrolyte Cell", Chem. Commun., 2000, pp. 1673-1674.

Marnellos et al., "Ammonia Synthesis at Atmospheric Pressure", Science, vol. 282, Oct. 2, 1998, pp. 98-99.

Marnellos et al., "Synthesis of Ammonia at Atmospheric Pressure with the Use of Solid State Proton Conductors", Journal of Catalysis, vol. 193, 2000, pp. 80-87.

Murakami et al., "Electrolytic Synthesis of Ammonia in Molten Salts Under Atmospheric Pressure", American Chemical Society, vol. 125, 2003, pp. 334-335.

Ouzounidou et al., "Catalytic and Electrocatalytic Synthesis of NH3 in a H+ Conducting Cell by Using an Industrial Fe Catalyst" Solid State Ionics, vol. 178, 2007, pp. 153-159.

Pappenfus et al., "Wind to Ammonia: Electrochemical Processes in Room Temperature Ionic Liquids", ECS Transactions, vol. 16, No. 49, 2009, pp. 89-93.

Pickett et al., "Electrosynthesis of Ammonia", Nature vol. 317, Oct. 17, 1985, pp. 652-653.

Rod et al., "Ammonia Synthesis at Low Temperatures", Journal of Chemical Physics, vol. 112, No. 12. Mar. 22, 2000, pp. 5343-5347.

Skulason et al., "A Theoretical Evaluation of Possible Transition Metal Electro-Catalysts for N2 Reduction", Phys. Chem. Chem. Phys., vol. 14, 2012, pp. 1235-1245.

Song et al., "Structure and Reactivity of Ru Nanoparticles Supported on Modified Graphite Surfaces: A Study of the Model Catalysts for Ammonia Synthesis", JACS Articles.

* cited by examiner

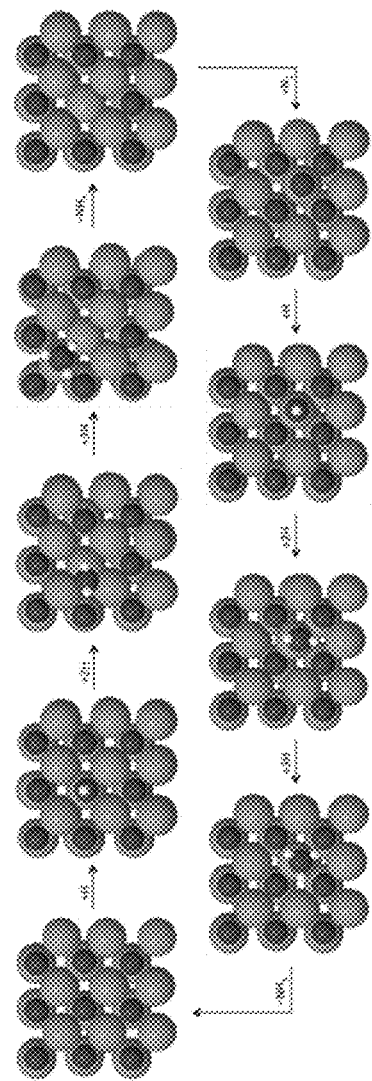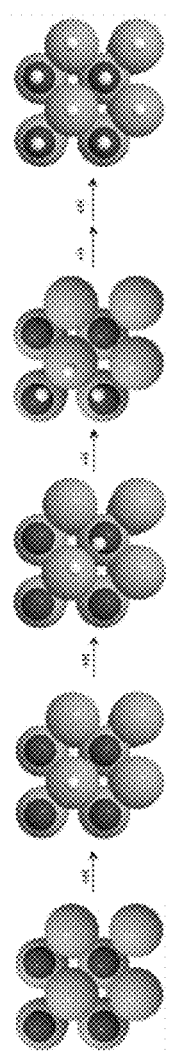
Figure 1a
Figure 1b

ELECTROLYTIC PRODUCTION OF AMMONIA

FIELD

The invention is within the field of process chemistry, and specifically relating to production of ammonia with electrolytic methods, and new catalysts therefor.

INTRODUCTION

Ammonia is one of the most highly produced chemicals worldwide. The industrial ammonia synthesis recognized nowadays as the Haber-Bosch process is the first heterogeneous catalytic system, a key element of the global industrial production of nitrogen fertilizer. Today, ammonia is also gaining attention as a possible energy carrier and a potential transportation fuel with high energy density but no $CO_2$ emission. The centralized and energy demanding Haber-Bosch process requires high pressure (150-350 atm) and high temperature (350-550° C.) to directly dissociate and combine nitrogen and hydrogen gas molecules over a ruthenium or iron based catalyst to form ammonia, by the following reaction:

A drawback of this industrial approach is the high temperature and pressure needed for kinetic and thermodynamic reasons. Another drawback and a more serious one is that the hydrogen gas is produced from natural gas. That multi-step process takes up the largest part of the whole chemical plant, and is the most costly and unfriendly with regards to the environment. That is the largest reason that a sustainable process is needed, since the natural gas will at some point be depleted. A small-scale system for decentralized ammonia production that uses less energy and ambient conditions would therefore be of great significance. Further, in order to optimise the efficiency of ammonia synthesis, new catalysts capable of hydrogenating dinitrogen at reasonable rate but at milder conditions will be much appreciated.

The triple bond in molecular nitrogen $N_2$ is very strong and as a consequence nitrogen is very inactive and frequently used as an inert gas. It is broken down by the harsh conditions in the Haber-Bosch process, however, it is also broken down at ambient conditions in a natural process, by microorganisms through nitrogenase enzyme. The active site of nitrogenease is a $MoFe_7S_9N$ cluster that catalyzes ammonia formation from solvated protons, electrons and atmospheric nitrogen through the electrochemical reaction

Inspired by nature, biological nitrogen fixation as an alternative approach to the Haber-Bosch process for synthesizing ammonia under ambient conditions has been attracting much attention. Much effort has been on research trying to develop similar electrochemical processes. While such studies have provided insight into the process of ammonia formation, the kinetics are still too slow for practical applications and in most cases hydrogen gas is dominantly formed more readily than protonation of nitrogen. The reduction of dinitrogen by protons and electrons to selectively form ammonia at room temperature and pressure has proven much more challenging than expected.

SUMMARY OF INVENTION

The present inventor has surprisingly found that certain metal nitride catalysts may be employed in electrochemical processes for producing ammonia. This has lead to the present invention, that makes possible ammonia production at ambient room temperature and atmospheric pressure.

In a first aspect, the invention sets forth a process for producing ammonia, the process comprising feeding gaseous nitrogen to an electrolytic cell, where it comes in contact with a cathode electrode surface, wherein said surface has a catalyst surface comprising a nitride catalyst, said electrolytic cell comprising a proton donor, and running a current through said electrolytic cell, whereby nitrogen reacts with protons to form ammonia. A further aspect of the invention provides a system for generating ammonia comprising an electrochemical cell with a cathode electrode surface having a catalytic surface, said surface charged with a catalyst comprising one or more nitride selected from the group consisting of Scandium nitride, Titanium nitride, Vanadium nitride, Chromium nitride, Mangan nitride, Copper nitride, Yttrium nitride, Zirconium nitride, Niobium nitride, Molybdenum nitride, Silver nitride, Hafnium nitride, Tantalum nitride, Gold nitride, Iron nitride, Cobalt nitride, Nickel nitride, Ruthenium nitride, Rhodium nitride, Palladium nitride, Osmium nitride and Iridium nitride.

The invention also relates to processes and systems that comprise the processes and systems for generating ammonia according to the invention. Thus, in another aspect according to the invention there is provided a process for removing $NO_x$ and/or $SO_x$ gas from a stream of gas, the method comprising steps of (a) generating ammonia in situ by the method as disclosed herein, and (b) reacting the ammonia thus produced with the stream of gas, whereby ammonia reacts with the $NO_x$ and/or the $SO_x$ in the stream of gas. The stream of gas can preferably be an engine exhaust, for example exhaust from an automobile engine, for example a diesel engine.

BRIEF DESCRIPTION OF FIGURES

The skilled person will understand that the drawings, described below, are for illustration purposes only. The drawings are not intended to limit the scope of the present teachings in any way.

FIGS. 1a-1b: a) Mars-van Krevelen mechanism for ammonia formation at the (100) facets of a RS structured metal nitrides. The first H atom directly binds surface N atom strongly, the second H atom binds strongly the same N as well as the third to make ammonia. b) Reaction mechanism for some of the (100) faces of RS, like TiN, TaN, HfN and ScN, where a monolayer H coverage forms on the surface and eventually results in formation of $H_2$ instead of making $NH_3$.

The closer the value of $-\Delta G$ to zero, the more active is the nitride with respect to ammonia formation.

Figure 5:
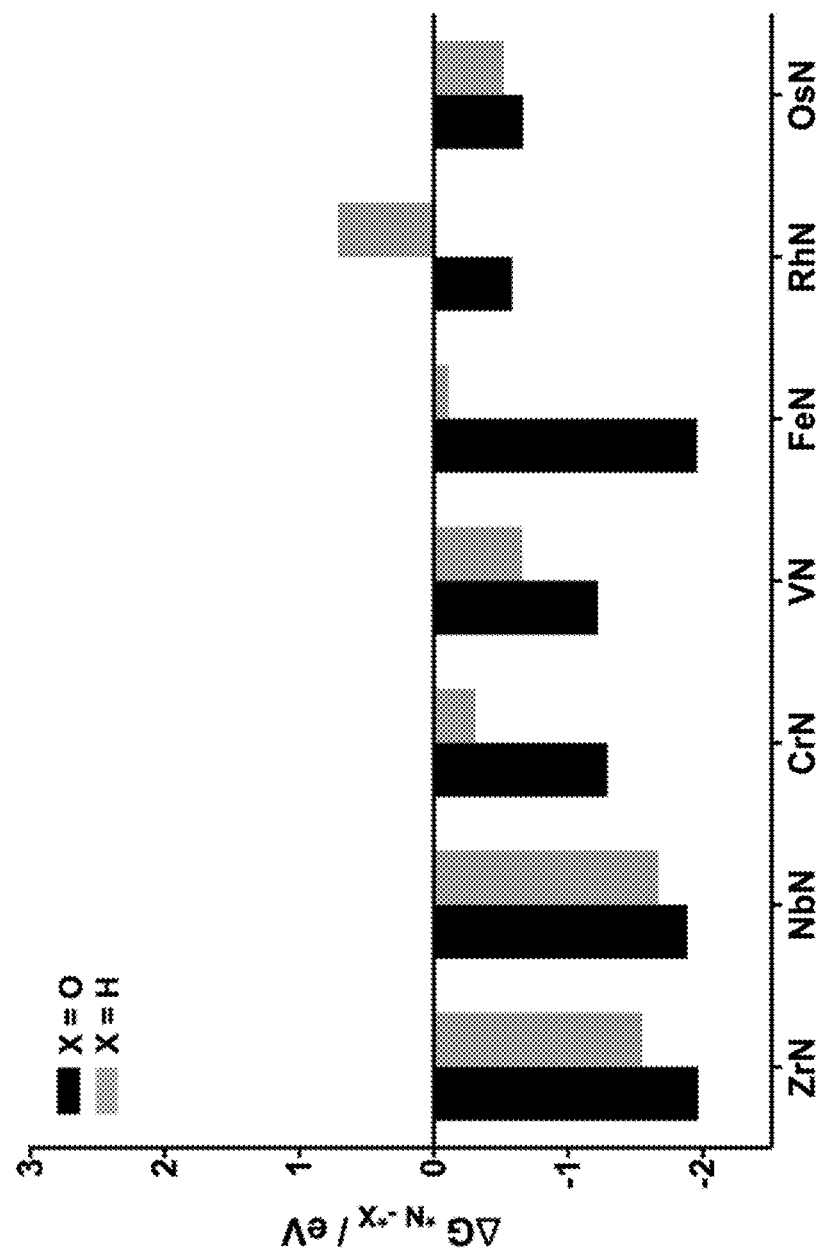

FIG. 5: Adsorption free energy difference of oxygen (referred to $H_2O$) and hydrogen (referred to $H_2$) with respect to nitrogen (referred to $N_2$) to the N-vacancy at the onset potentials required to reduce $N_2$ to $NH_3$ for each nitrides. In all cases, except for RhN, the vacancy will be filled with nitrogen rather than being poisoned by hydrogen or oxygen.

Figure 6:
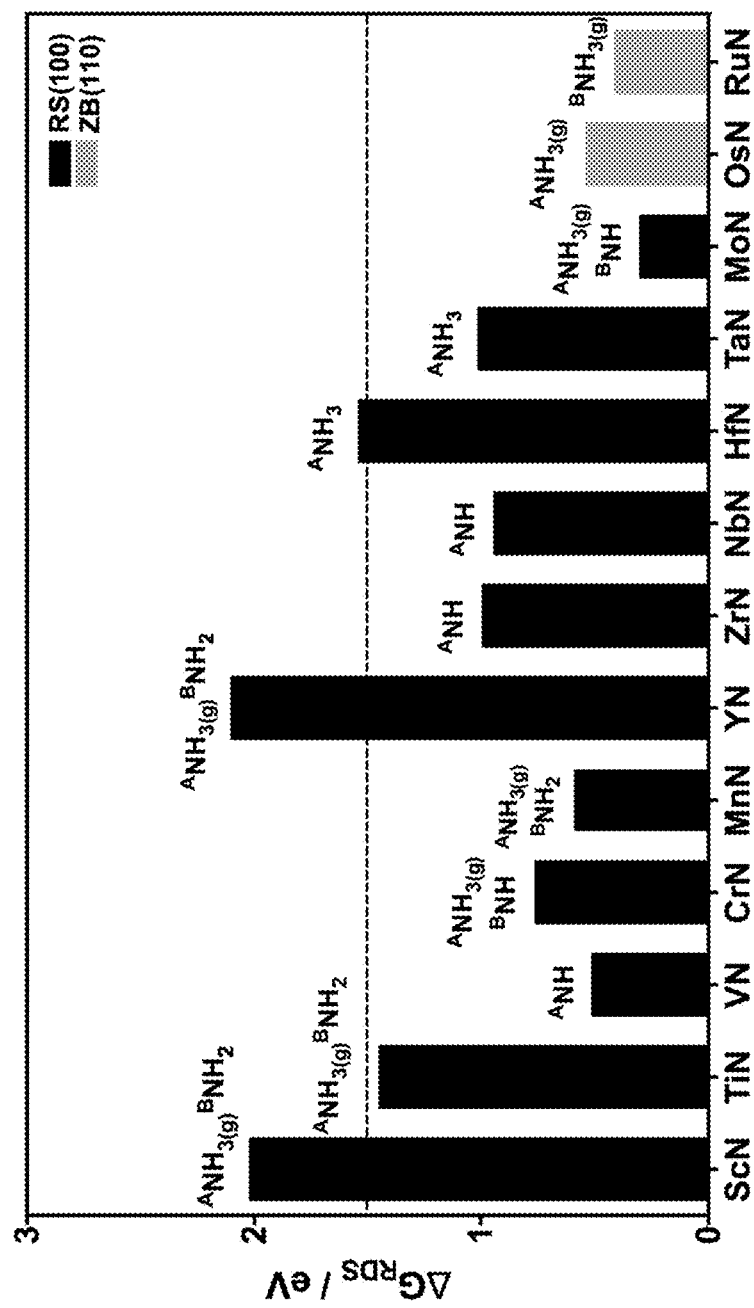

FIG. 6. Free energy change ($\Delta G_{RDS}$, in eV) of the rate-determining step of $NH_3$ formation on transition metal nitride catalysts. A constrained mechanism was considered, where H addition is restricted to a single surface site and $6(H^++e^-)$ are used to form $2NH_3$. The horizontal dashed line indicates the cut-off value in the screening for an appropriate catalyst; all nitrides with $\Delta G_{RDS} \leq 1.5$ eV have the possibility of being catalytically active towards ammonia formation and are considered further in the study. The labels on each bar indicate the species formed in the rate-determining step.

Figures 7A, 7B:
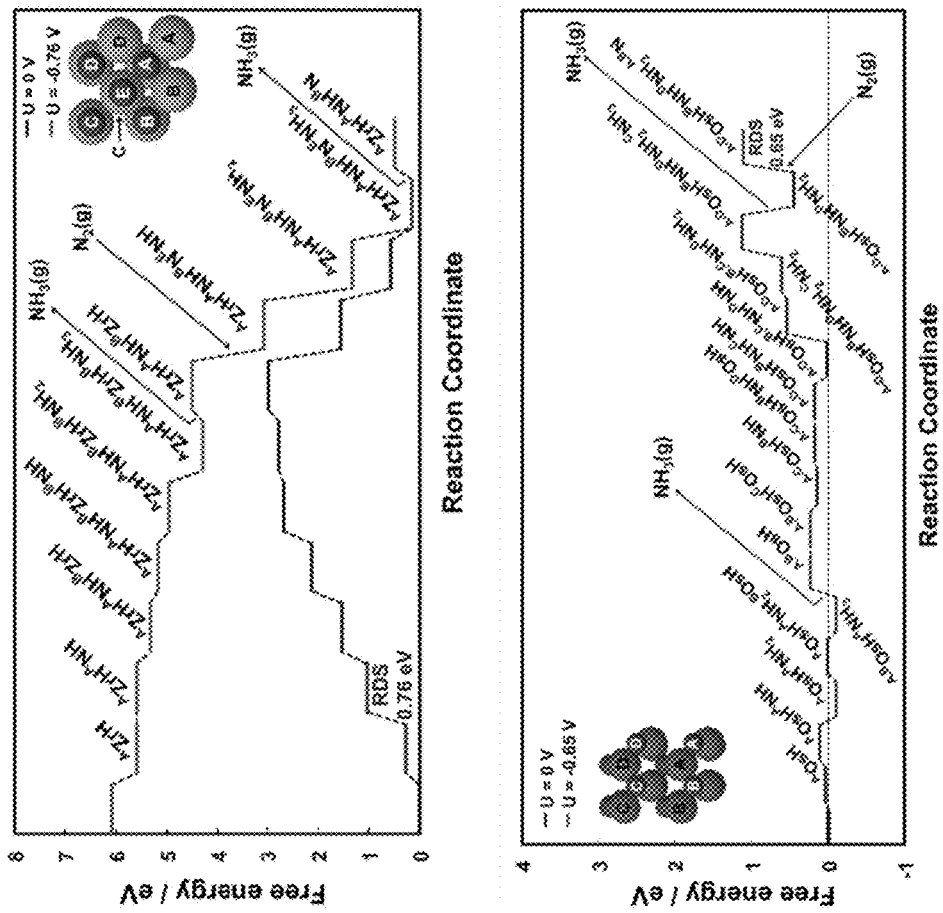

FIGS. 7a-7b. Free energy diagram for $NH_3$ formation via an unconstrained Mars-van Krevelen mechanism on the (100) facet of RS ZrN (a) and the (110) facet of ZB OsN (b). For ZrN the rate-determining step is the second protonation step with $\Delta G=0.76$ eV. Upon replenishment of the N-vacancy, one proton that was already adsorbed on Zr metal ($^BZrH$) migrates to the N-adatom to make NH ($^ENH$). The lower line in (a) indicates the free energy of all the stable intermediates calculated at zero potential. The upper line represents the free energy of all the stable intermediates at the onset potential. For OsN the RDS is to fill the N-vacancy with $\Delta G=0.65$ eV. As the RDS involves no proton-electron transfer, no bias is applied and the free energy landscape of OsN is depicted only at zero potential.

Figure 8:
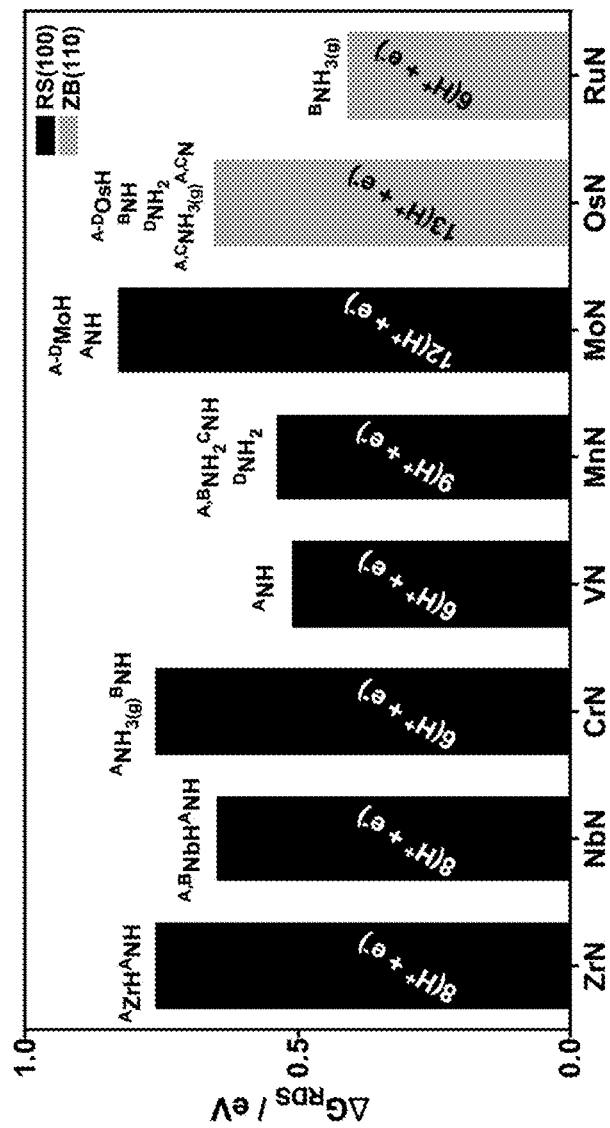

FIG. 8. Free energy change ($\Delta G_{RDS}$, in eV) of the rate-determining step of $NH_3$ formation on transition metal nitride catalysts. An unconstrained mechanism is considered, where at each H addition step every possible adsorption site is investigated including other N atoms, metal atoms and bridging sites and at least $6(H^++e^-)$ are needed to form $2NH_3$. The labels above each bar indicate the species formed in the rate-determining step, the notation of which is explained in FIG. 5. The labels in each bar indicate the number of protons and electrons required to make $2NH_3$.

Figure 9:
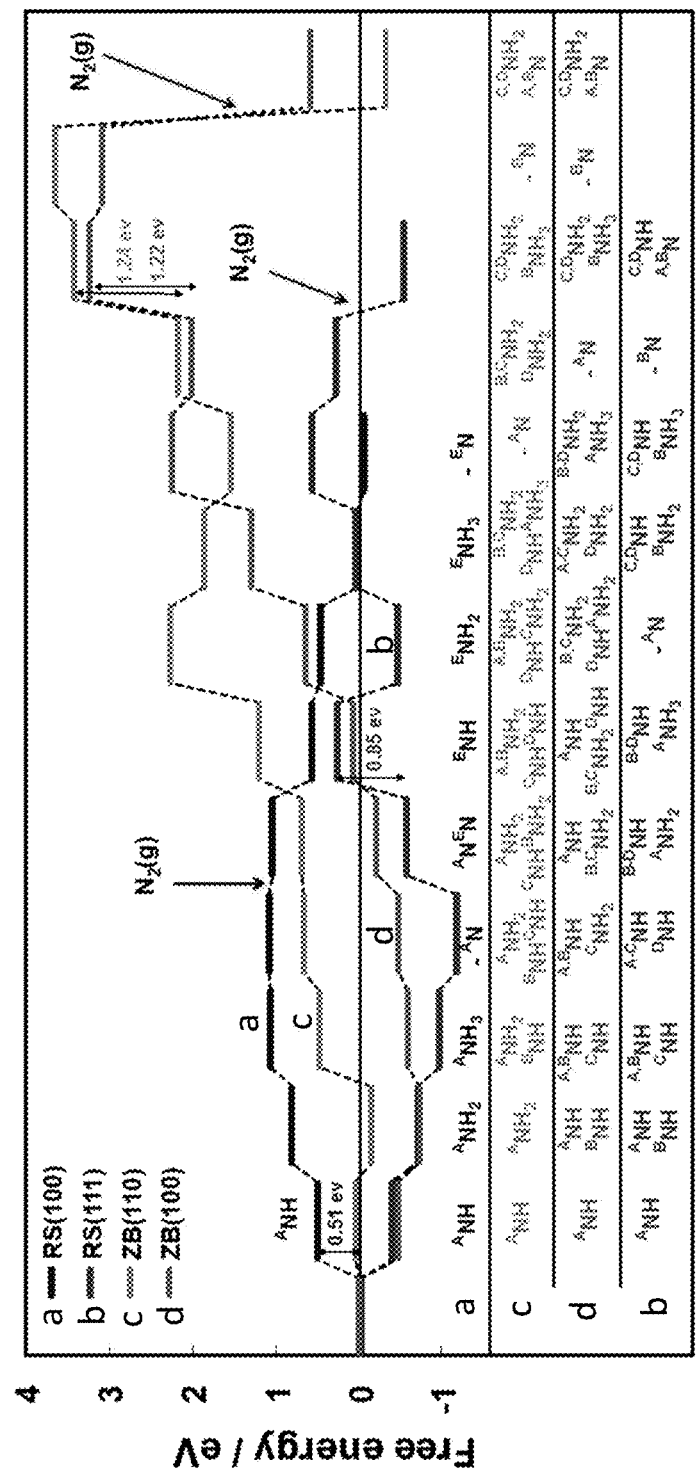

FIG. 9. Comparison of the free energy diagrams for $NH_3$ formation via Mars-van Krevelen mechanism on different facets of RS and ZB crystal structures of VN at zero potential. Double-ended arrows show the potential-determining step on each facet. Except the (100) facets of RS of VN for which single-vacancy approach is energetically favorable, for other facets replenishment of dimer-vacancy is more dominant.

FIGS. 10a-10d. The free energy diagrams of the (100) facets of the RS structure of ZrN (A), NbN (B), VN (C) and the (111) of ZrN (D) at zero potential when vacancy is filled with $N_{2(g)}$ either associatively or dissociatively (either single- or dimer-vacancy). For NbN (B), these two paths contribute to formation of two different intermediates. Therefore, species formed at each different step are shown differently. For the RS(111) of ZrN (D) associative MVK should be preferred to dissociative dimer-vacancy as it demands slightly less negative over-potential (0.14 V) for the ammonia reaction to proceed.

Figure 11:
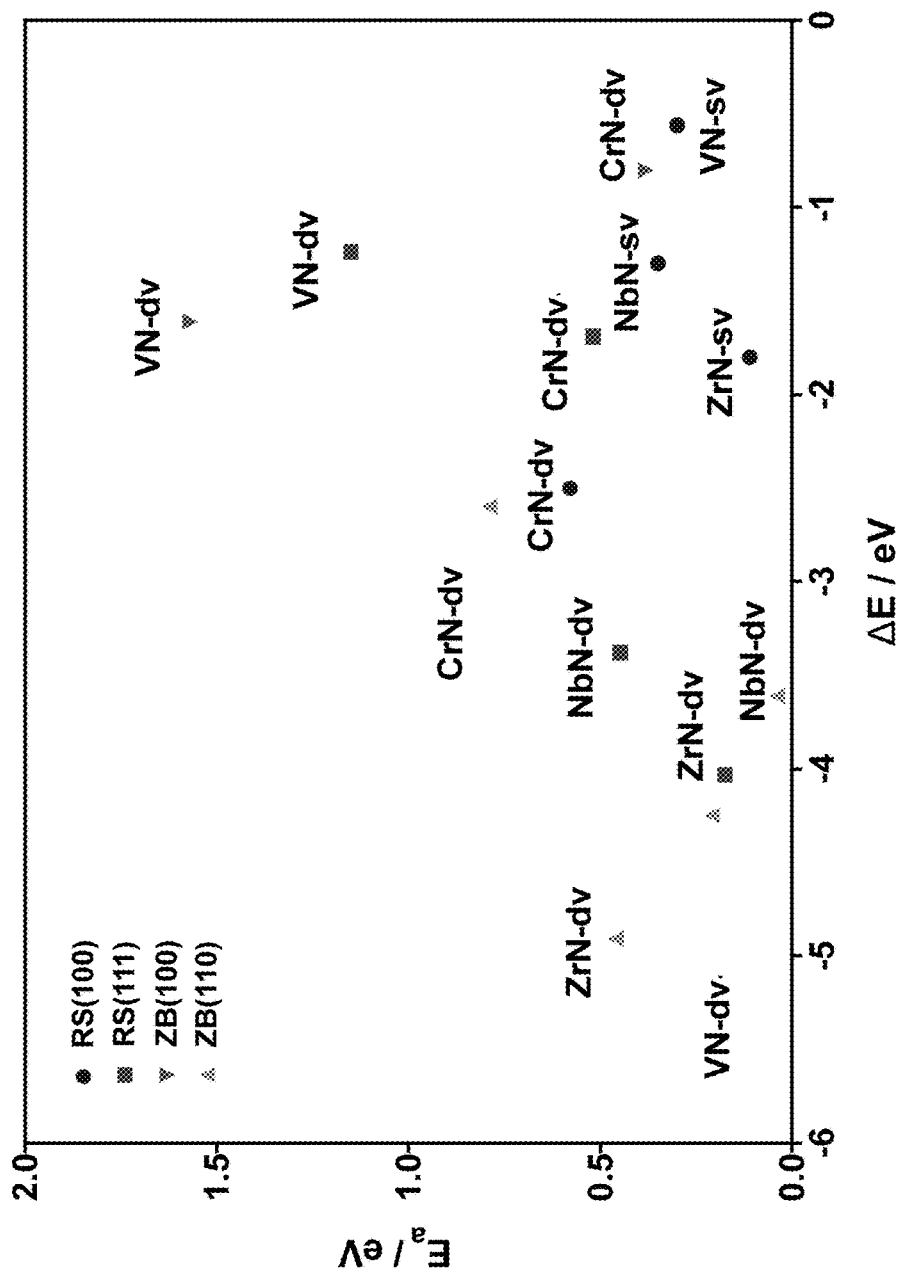

FIG. 11. Energy differences ($\Delta E=E2-E1$) of a replenished vacancy with nitrogen (E2) and nitride with N-vacancy on the surface and $N_2$ in vacuum (E1) and the associated activation barrier of $N_2$ splitting ($E_a$). Nitrides for which dissociative single-vacancy is more favourable are shown by "sv" and those which dimer-vacancy is more dominant for is specified by "dv". Dissociation barriers above 0.70 eV is accounted as large barriers difficult to overcome at ambient conditions.

Figure 12:
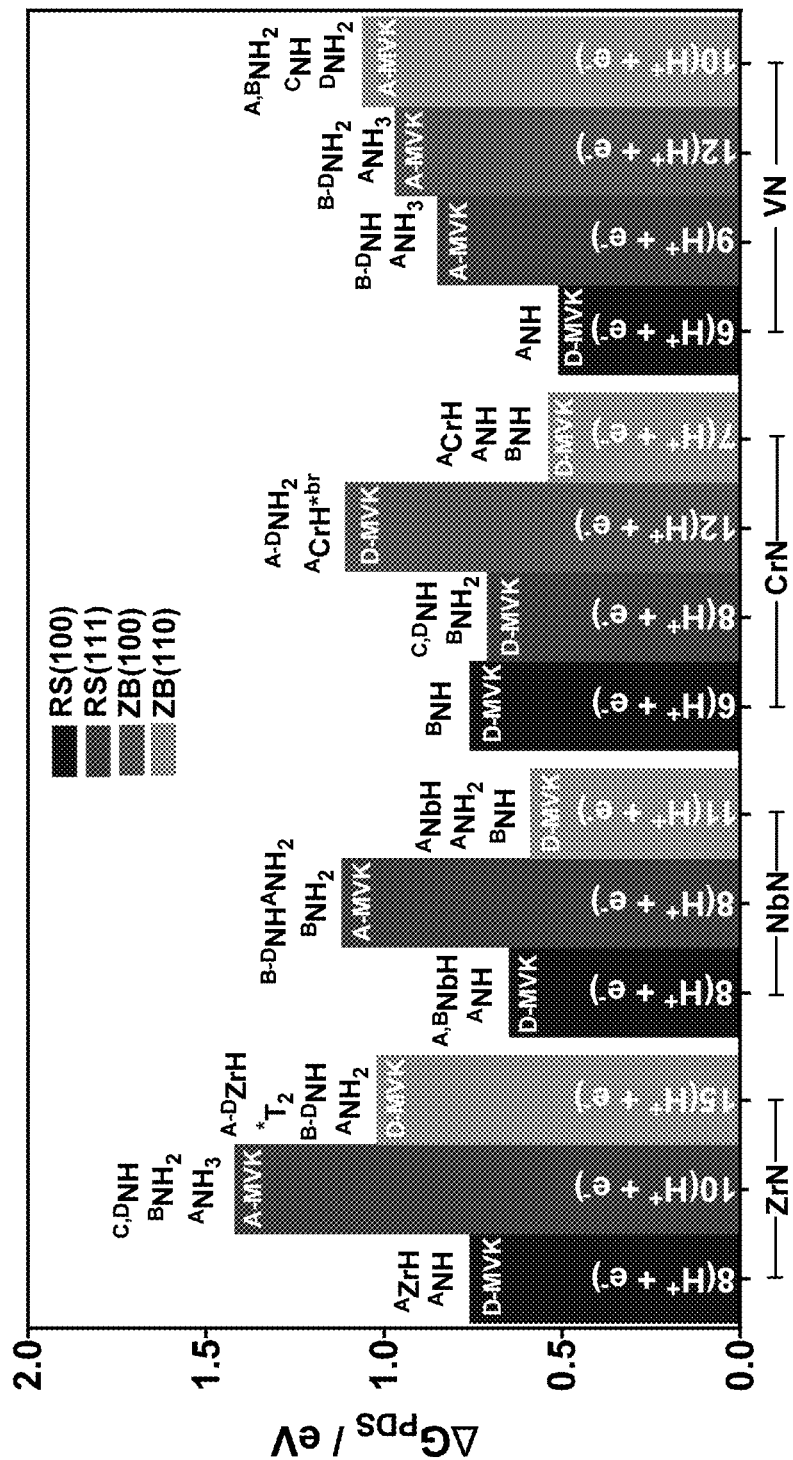

FIG. 12. Comparison of the free energy change ($\Delta G_{PDS}$, in eV) of the PDS of $NH_3$ formation on four different facets of ZrN, VN, NbN and CrN candidates. A MVK mechanism is considered, where at each H addition steps every possible adsorption site is investigated including other N atoms, metal atoms and bridging sites with at least $6(H^++e)$ needed to form $2NH_3$. The most favorable reaction mechanism, either associative (A-MVK) or dissociative (D-MVK), is specified for each surface. The labels above each bar indicate the species formed in the PDS, the notation of which is explained in the above under FIG. 9. The labels in each bar indicate the number of protons and electrons required to complete the catalytic cycle of $2NH_3$ formation. The (100) facets of ZB structure of ZrN and NbN are not included owing to the structural instability. *T for the ZB(110) of ZrN stands for a through-bridge positioning of adsorbed H. *br for the ZB(100) of CrN denotes a bridge positioning of adsorbed H between 2Crs.

Figure 13:
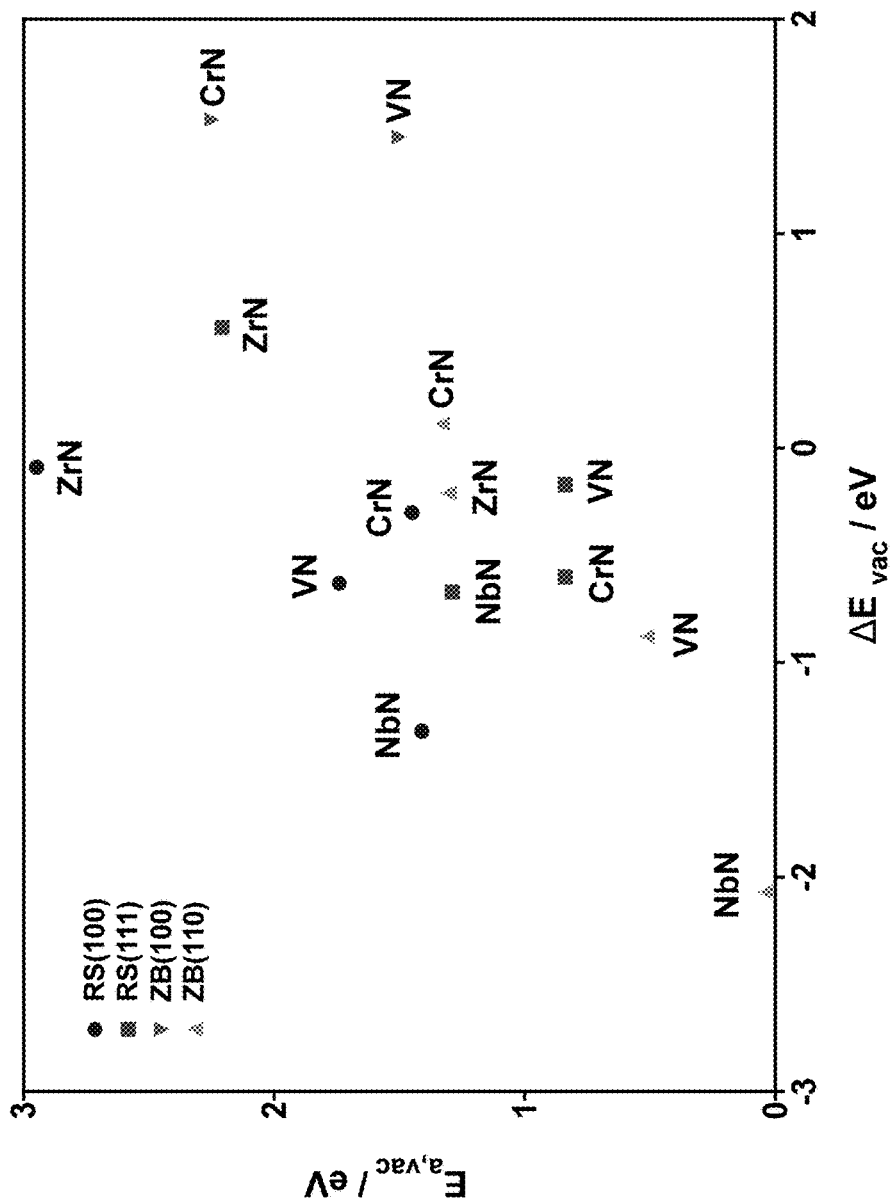

FIG. 13. Energy differences ($\Delta E_{vac}$) of a N-vacancy at the surface layer and in the first subsurface layer of a nitride and the associated activation barrier of N-vacancy migration ($E_{a,vac}$). The (100) facets of the ZB structure of ZrN and NbN were found unstable and thus not shown in here and excluded from further study. The ZB(110) of ZrN and NbN were found unstable for formation of *N and *NH on the surface.

DETAILED DESCRIPTION

In the following, exemplary embodiments of the invention will be described. Examples of certain embodiments are also provided, referring to the figures. These examples are provided to provide further understanding of the invention, without limiting its scope.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps, can be present between some or all of the described steps.

It should be appreciated that the invention is applicable for systems and processes for generating ammonia. Further, the system and process according to the invention is illustrated in the embodiments that follow. It should be appreciated that the invention can be modified and/or used within, or in combination with, systems that require use and/or formation of ammonia.

The present invention is based on the surprising discovery that on the surface of certain metal halide catalysts, it is possible to form ammonia at ambient temperature and pressure. Given the importance of ammonia, not least in the production of fertilizer, and the energy intensive and environmentally unfavourable conditions that are typically used during its manufacture, the invention finds important applicability in various industries.

Thus, the invention provides processes and systems for generating ammonia at ambient temperature and pressure. In the process and system of the present invention, the electrolytic cell can be any of a range of conventional commercially suitable and feasible electrolytic cell designs that can accommodate a special purpose cathode in accordance with the invention. Thus, the cell and system may in some embodiment have one or more cathode cells and one or more anode cells.

An electrolytic cell in the present context is an electrochemical cell that undergoes a redox reaction when electrical energy is applied to the cell.

The proton donor can be any suitable substance that is capable of donating protons in the electrolytic cell. The proton donor can for example be a an acid, such as any suitable organic or inorganic acid.

The electrolytic cell can have three parts or components, a cathode electrode, an anode electrode and an electrolyte. The different parts or components can be provided in separate containers, or they can be provided in a single container. The electrolyte can be an aqueous solution in which ions are dissolved. The electrolyte can also be a molten salt, for example a sodium chloride salt.

In general terms, the catalyst on the electrode surface should ideally have the following characteristics: It should (a) be chemically stable, it should (b) not become oxidized or otherwise consumed during the electrolytic process, it should facilitate the formation of ammonia, and (d) use of the catalyst should lead to the production of minimal amount of hydrogen gas. As will be further described, the catalyst nitrides according to the invention fulfill these characteristics.

An advantage of the present invention is that the process can be suitably operated using aqueous electrolytes, such as preferably aqueous solutions with dissolved electrolytes (salts). Thus, in preferred embodiments of the process and system, the electrolytic cell comprises one or more aqueous electrolytic solutions, in one or more cell compartments. Aqueous electrolyte solutions may comprise any of various typical inorganic or organic salts such as but limited to soluble salts of chloride, nitrate, chlorate bromide, etc. e.g. sodium chloride, potassium chloride, calcium chloride, ammonium chloride, and more. The aqueous electrolyte solution can also further, or alternatively, comprise one or more organic or inorganic acids. Inorganic acids can include mineral acids that include but are not limited to, hydrochloric acid, nitric acid, phosphoric acid, sulphuric acid, boric acid, hydrofluoric acid, hydrobromic acid, and perchloric acid.

As appears from herein, the essential feature of the present invention concerns the composition and structure of the cathode electrode. In certain embodiments, the nitride catalyst on the cathode electrode surface is selected from one or more of the following: Scandium nitride, Titanium nitride, Vanadium nitride, Chromium nitride, Mangan nitride, Copper nitride, Yttrium nitride, Zirconium nitride, Niobium nitride, Molybdenum nitride, Silver nitride, Hafnium nitride, Tantalum nitride, Gold nitride, Iron nitride, Cobalt nitride, Nickel nitride, Ruthenium nitride, Rhodium nitride, Palladium nitride, Osmium nitride and Iridium nitride. Preferably the catalyst comprises one or more of Vanadium nitride, Chromium nitride, and Zirconium nitride.

Depending on the substance composition of the catalyst, a suitable surface crystal structure may be preferred. Various different crystal structures exist for metal nitrides and different structures can be obtained at different growth conditions. It is within scope of the skilled person to select appropriate surface crystal structures. For example, some of the simplest and quite common structures are the rocksalt (RS) and zincblende (ZB) structures.

Accordingly, in some embodiments, the catalyst surface in accordance with the invention has a crystal structure selected from rocksalt (RS) and zincblende (ZN). Other crystal structures are also possible, for example caesium chloride structure, or other structures that are known in the art (see., e.g., International Tables for Crystallography; http://it.iucr.org).

Several different surface facets may exist for a given crystal structure (polycrystalline surfaces). For example, the (100) and the (111) facets of the rocksalt structure and the (100) and the (110) facets of the zincblende structures can be chosen. In some embodiments, VN, ZrN, MnN and CrN nitrides can be of rocksalt structure with the (100) and (111) facets. Such nitrides have been shown to be the most common experimentally, and are formed at various experimental conditions.

Accordingly, in some embodiments, the catalyst surface comprises a surface selected from rocksalt type (RS) and zincblende type (ZB) surfaces. The surfaces can have any suitable facet, including but not limited to 100 facet, 111 facet and 110 facet. In some embodiments, the surface facet can be selected from RS (100) facet, RS (111) facet, ZB (100) facet, and ZB (110) facet. Non-limiting examples of substance with useful RS (100) facet surfaces include Titanium nitride, Tantalum nitride, Zirconium nitride, Hafnium nitride, Scandium nitride, Chromium nitride, Niobium nitride and Vanadium nitride. Useful non-limiting examples of substances with ZB (110) facet surface include Cobalt nitride, Iron nitride, Nickel nitride, Osmium nitride, Iridium nitride, Ruthenium nitride, Palladium nitride, Osmium nitride and Rhodium nitride.

In some preferred embodiments, the catalyst can be selected from RS (100) of VN, ZB (110) of CrN, ZB (110) of NbN, RS (100) of NbN, RS (111) of CrN, RS (100) of CrN, RS (100) of ZrN, RS (111) of VN, ZB (100) of VN, ZB (110) of ZrN, ZB (110) of VN, AB (100) of CrN, and RS (111) of ZrN.

As will be apparent to the skilled person, the catalyst according to the invention can comprise a single metal nitride. The catalyst can also comprise a mixture of two or more metal nitrides. Such mixed nitrides can comprise a single structure, for example a rocksalt or zincblende structure. The mixed nitrides can also comprise a mixture of nitrides that are of different crystal structures. The mixed nitrides can further comprise a single, or a mixture of, facets. Such mixed nitride catalysts can be grown or manufactured separately and then assembled into mixed catalysts comprising the different nitrides with different crystal structures.

As described in more detail herein, running a current through the electrolytic cell leads to a chemical reaction in which nitrogen reacts with protons to form ammonia. The running of current is achieved by applying a voltage to the cell. The invention makes possible electrolytic production of ammonia at a low electrode potential, which is beneficial in terms of energy efficiency and equipment demands.

Without intending to be bound by theory, it is believed that the nitride catalysts are capable of shifting the bottleneck of ammonia synthesis from $N_2$ cleavage to the subsequent formation of nitrogen-hydrogen species (*NH, *NH$_2$, or *NH$_3$) due to which simpler but yet higher rate of ammonia formation is anticipated.

In certain useful embodiments of the invention ammonia can be formed at an electrode potential at less than about −1.0V, less than about −0.8 V, and preferably less than about −0.6 V or less than about −0.4 V. In some embodiments, ammonia can be formed at electrode potential in the range of about −0.2 V to about −1.0 V, such as in the range of about −0.3 V to about −0.8 V, such as in the range of about −0.4 V to about −0.8 V, or in the range of about −0.4 V to about −0.6 V. The upper limit of the range can be about −0.6 V, about −0.7 V, about −0.8 V, or about −1.0 V. The lower limit of the range can be about −0.2 V, about −0.3 V, about −0.4 V, or about −0.6 V. In one preferred embodiment, ammonia can be formed at an electrode potential within the range from about −0.40 V to about −0.60 V.

An advantage of the present invention is the efficiency of $NH_3$ formation over $H_2$ formation, which has been a challenge in prior art investigations and trials. In an embodiment of the invention, less than about 20% moles $H_2$ are formed compared to moles $NH_3$ formed, and preferably less than 10% moles $H_2$ are formed compared to moles $NH_3$, and more preferably less than 5% moles $H_2$ are formed compared to moles $NH_3$, and yet more preferably less than 2.5%, or less than 1%.

The system of the invention is suitably designed in order to accommodate one or more of the above process features. It is an advantage of the invention that the system can be made small, robust and cheaply, such as for using locally for production of fertilizer close to the intended site of use.

Ammonia can be used as such as fertilizer, by injecting into soil as gas, although this requires investment by farmers in pressurized storage tanks and injection machinery. Ammonia can also be used to form urea, typically by reacting with carbon dioxide. Ammonia can be reacted to form nitric acid, which in turn is readily reacted to form ammonium nitrate. Accordingly, systems and processes of the present invention can be readily combined with present solutions for reacting the produced ammonia to other desired products such as but not limited to the above mentioned.

$NO_x$ and $SO_x$ are generic terms for mono-nitrogen and mono-sulfur axoides, such as NO, $NO_2$, SO, $SO_2$ and $SO_3$. These gases are produced during combustion, especially at high temperatures. In areas of high motor vehicle traffic, the amount of these pollutants can be significant.

Accordingly, a useful aspect of the invention relates to a system for removing $NO_x$ and/or $SO_x$ from a stream of gas, by reacting the stream of gas with ammonia that is generated in situ in the stream, or in a system that can be fluidly connected to the stream of gas. In this context, in situ should be understood as meaning that the ammonia is generated within the system, for example within the gas stream, or in a compartment within the system that is fluidly connected to the gas stream. The ammonia thus generated, when in contact with the stream of gas, will react with $NO_x$ and/or $SO_x$ in the stream of gas so as to convert these toxic species to other molecular species, such as $N_2$, $H_2O$ and $(NH_4)_2SO_4$. In some embodiments, the system can be for use in an automobile engine exhaust or in other engines, where ammonia can be generated in situ by a process according to the present invention, and which is then used to reduce $SO_x$ and/or $NO_x$ exhaust gases from the engine. Such system can suitably use electric current produced by conversion from the car engine. Thus, by using electric current from a car engine, ammonia can be generated in situ, and the ammonia thus generated can be allowed to react with SOx and/or NOx from the gas exhaust of the automobile. The ammonia can be generated in the automobile, and subsequently fed into the car exhaust. The ammonia can also be generated in situ within the automobile exhaust system. Thereby, $NO_x$ and/or $SO_x$ are removed from the car exhaust, reducing the amount of pollutants in the exhaust.

Non-limiting embodiments according to the invention include:

1. A process for producing ammonia comprising:
    feeding gaseous nitrogen to an electrolytic cell, where it comes in contact with a cathode electrode surface, wherein said surface has a catalyst surface comprising a nitride catalyst, said electrolytic cell comprising a proton donor, running a current through said electrolytic cell, whereby nitrogen reacts with protons to form ammonia.
2. The process of embodiment 1, wherein said nitride catalyst comprises one or more nitride selected from the group consisting of Scandium nitride, Titanium nitride, Vanadium nitride, Chromium nitride, Mangan nitride, Copper nitride, Yttrium nitride, Zirconium nitride, Niobium nitride, Molybdenum nitride, Silver nitride, Hafnium nitride, Tantalum nitride, Iron nitride, Cobalt nitride, Nickel nitride, Ruthenium nitride, Rhodium nitride, Palladium nitride, Osmium nitride and Iridium nitride.
3. The process of embodiment 1 or 2, wherein the catalyst surface comprises a surface selected from rocksalt type (RS) and zincblende type (ZB) surfaces.
4. The process of embodiment 3, wherein catalyst surface comprises a surface selected from RS (100) facet, RS (111) facet, ZB (100) facet, and ZB (110) facet.
5. The process of any of embodiments 2 to 4, wherein said catalyst surface comprises RS (100) facet surface selected from the group consisting of Titanium nitride, Tantalum nitride, Zirconium nitride, Hafnium nitride, Scandium nitride, Yttrium nitride, Mangan nitride, Niobium nitride, Silver nitride, Copper nitride, Chromium nitride, and Vanadium nitride.
6. The process of any of embodiments 2 to 4, wherein said catalyst surface comprises ZB (110) facet surface selected from the group consisting of Cobalt nitride, Iron nitride, Nickel nitride, Osmium nitride, Iridium nitride, Ruthenium nitride, Palladium nitride, and Rhodium nitride.
7. The process of any of the preceding embodiments wherein said catalyst comprises one or more of zirconium nitride, vanadium nitride, chromium nitride, niobium nitride, iron nitride and osmium nitride.
8. The process of any of the preceding embodiments, wherein ammonia is formed at an electrode potential at less than about −0.8 V, and preferably less than about −0.6 V.
9. The process of any of the preceding embodiments, wherein ammonia is formed at an electrode potential within a range from about −0.4 V to about −0.60 V.
10. The process of any of the preceding embodiments, wherein less than 20% moles $H_2$ are formed compared to moles $NH_3$ formed, and preferably less than 10% and more preferably less than 5%.
11. The process of any of the preceding embodiments, wherein said electrolytic cell comprises one or more aqueous electrolytic solution.
12. A system for generating ammonia comprising an electrochemical cell with a cathode electrode surface having a catalytic surface, said surface charged with a catalyst comprising one or more nitride selected from the group consisting of Scandium nitride, Titanium nitride, Vanadium nitride, Chromium nitride, Mangan nitride, Copper nitride, Yttrium nitride, Zirconium nitride, Niobium nitride, Molybdenum nitride, Silver nitride, Hafnium nitride, Tantalum nitride, Iron nitride, Cobalt nitride, Nickel nitride, Ruthenium nitride, Rhodium nitride, Palladium nitride, Osmium nitride and Iridium nitride.
13. The system of embodiment 12, wherein the catalyst surface comprises a surface selected from rocksalt type (RS) and zincblende type (ZB) surfaces.

14. The system of embodiment 13, wherein catalyst surface comprises a surface selected from RS (100) facet, RS (111) facet, ZB (100) facet, and ZB (110) facet.
15. The system of embodiment 14 or 14, wherein said catalyst surface comprises RS (100) facet surface selected from the group consisting of Titanium nitride, Tantalum nitride, Zirconium nitride, Hafnium nitride, Scandium nitride, Yttrium nitride, Mangan nitride, Niobium nitride, Silver nitride, Copper nitride, Chromium nitride, and Vanadium nitride.
16. The system of embodiment 13 or 14, wherein said catalyst surface comprises ZB (110) facet surface selected from the group consisting of Cobalt nitride, Iron nitride, Nickel nitride, Osmium nitride, Iridium nitride, Ruthenium nitride, Palladium nitride, and Rhodium nitride.
17. The system of any of embodiments 13 to 16 wherein said catalyst comprises one or more of zirconium nitride, vanadium nitride, niobium nitride, iron nitride and osmium nitride and chromium nitride.
18. The system of any of embodiments 12 to 17, wherein said electrolytic cell comprises one or more aqueous electrolytic solution.
19. A process for removing $NO_x$ and/or $SO_x$ gas from an engine exhaust, the method comprising steps of (a) generating ammonia in situ by a process according to any of the embodiments 1 to 11, and (b) reacting the ammonia thus produced with the engine exhaust, whereby ammonia reacts with the $NO_x$ and/or the $SO_x$ in the engine exhaust.
20. The process according to embodiment 19, wherein the process comprises reacting the in situ generated ammonia with $NO_x$ in the engine exhaust.
21. The process according to any one of the embodiments 1 to 11, wherein the catalyst comprises Vanadium nitride or Chromium nitride.
22. The process according to embodiment 21, wherein the catalyst comprises a surface selected from RS (100) facet, RS (111) facet, ZB (100) facet, and ZB (110) facet.
23. The process according to embodiment 21 or 22, wherein the catalyst is selected from the group consisting of Vanadium nitride having an RS (100) facet, Chromium nitride having an RS (111) facet, Vanadium nitride having a ZB (100) facet and Chromium nitride having an ZB (110) facet.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about −0.3" shall also cover exactly −0.3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention will now be illustrated by the following non-limiting examples, that further describe particular advantages and embodiments of the present invention.

Example 1: DFT Calculations of Free Energy Profile for Candidate Catalysts

Density functional theory (DFT) calculations were used to calculate the free energy profile for the reduction of surface nitrogen atom in order to find promising candidates amongst a wide range of nitride catalysts worthwhile being tested experimentally. Surface and vacancy stability, detailed catalytic activity, defect poisoning and onset potential required for ammonia formation were considered.

The calculations were conducted with DFT[53,54] using the RPBE exchange correlation functional[55]. A plane wave basis set[56,57] with an energy cutoff at 350 eV was used with a PAW[58] representation of the core electrons as implemented in the VASP code[56,57,59,60]. Minimum energy paths (MEP) and activation energy for transitions were calculated using the nudged elastic band method (NEB)[61,62]. A previous study showed several of the 3d mononitrides to be either antiferromagnetic (RS VN, CrN, MnN, FeN and ZB MnN) or ferromagnetic (ZB VN, CrN) at their equilibrium lattice constant and as such were treated as spin-polarized[69]. All other calculations were spin restricted to singlet state. The self-consistent electron density was determined by iterative diagonalization of the Kohn-Sham Hamiltonian, with the occupation of the Kohn-Sham states being smeared according to a Fermi-Dirac distribution with a smearing parameter of $k_B T=0.1$ eV. A 4×4×1 Monkhorst-Pack[63] k-point sampling was used for all the surfaces and maximum symmetry was applied to reduce the number of k-points in the calculations.

RS and ZB structures, both mono-nitride structure, were used in this study to model the transition metal nitrides. Both structures were modeled in their bulk form with similar DFT calculations. The (100) and the (111) facets of RS and the (100) and the (110) facets of ZB were considered. Each nitride slab was comprised of 40 atoms in five layers, with each layer consisting of four metal atoms and four nitrogen atoms. Boundary conditions were periodic in the x and y directions and neighboring slabs were separated by 12 Å of vacuum in the z direction. For all the structures, two bottom layers of the slab were fixed and top layers, as well as adsorbed species, were allowed to relax. During structural optimizations the energy was converged to within 0.01 eV. The lattice constants for all the structures were calculated at the RPBE[55] level.

The overall reaction of the electrochemical process is:

$$N_2 + 6H^+ + 6e^- \rightleftharpoons 2NH_3 \quad (3)$$

In this study heterogeneous Mars-van Krevelen-type[52] surface reactions was considered where a surface N atom is reduced to ammonia and the created N-vacancy is then repaired with $N_2$ molecule injected to the system. Hydrogenation of the surface was carried out through Heyrovsky mechanism[64] where surface nitrogen atom is successively hydrogenated by direct attachment of protons from the solution and electrons from the electrode surface.

For the promising candidates the dominant mechanism observed in this study was where the first proton directly binds surface N atom strongly. After that, the second proton binds the same surface N atom as well as the third to form ammonia. The reaction mechanism is shown with stick-and-ball representation in FIG. 1(a) and in the equations (4)-(10):

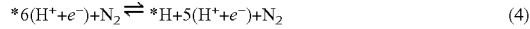
$$*6(H^+ + e^-) + N_2 \rightleftharpoons *H + 5(H^+ + e^-) + N_2 \quad (4)$$

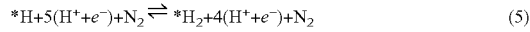
$$*H + 5(H^+ + e^-) + N_2 \rightleftharpoons *H_2 + 4(H^+ + e^-) + N_2 \quad (5)$$

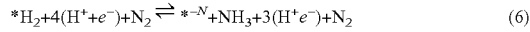
$$*H_2 + 4(H^+ + e^-) + N_2 \rightleftharpoons *^{-N} + NH_3 + 3(H^+ + e^-) + N_2 \quad (6)$$

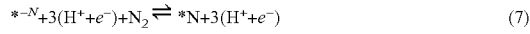
$$*^{-N} + 3(H^+ + e^-) + N_2 \rightleftharpoons *N + 3(H^+ + e^-) \quad (7)$$

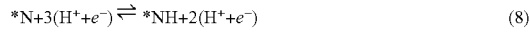
$$*N + 3(H^+ + e^-) \rightleftharpoons *NH + 2(H^+ + e^-) \quad (8)$$

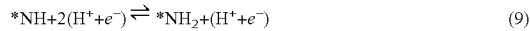
$$*NH + 2(H^+ + e^-) \rightleftharpoons *NH_2 + (H^+ + e^-) \quad (9)$$

$$*NH_2 + (H^+ + e^-) \rightleftharpoons * + NH_3 \quad (10)$$

An asterisk, *, represents a site on the surface that can be either N or metal atom. A nitrogen defect in the surface layer is denoted as $*^{-N}$. DFT calculations were used to estimate the minimum energy configuration of each reaction step and the adsorption energies of all intermediate steps according to reactions (4)-(10). The most favorable position of the H-adatom was in each case determined by relaxing the nitride with the adatom in various positions and finding the one with the lowest total energy. A slightly different reaction mechanism was considered for the (110) faces of ZB structure. Due to huge barrier for filling the created vacancy after formation of the first ammonia, instead, two $NH_3$ were formed and two N-vacancies were created. Then dimer vacancies were repaired with $N_2$ molecule from the gas phase. The mechanism is given in the equations (11)-(17).

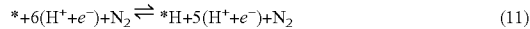
$$* + 6(H^+ + e^-) + N_2 \rightleftharpoons *H + 5(H^+ + e^-) + N_2 \quad (11)$$

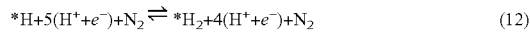
$$*H + 5(H^+ + e^-) + N_2 \rightleftharpoons *H_2 + 4(H^+ + e^-) + N_2 \quad (12)$$

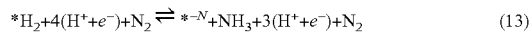
$$*H_2 + 4(H^+ + e^-) + N_2 \rightleftharpoons *^{-N} + NH_3 + 3(H^+ + e^-) + N_2 \quad (13)$$

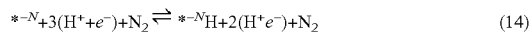
$$*^{-N} + 3(H^+ + e^-) + N_2 \rightleftharpoons *^{-N}H + 2(H^+ + e^-) + N_2 \quad (14)$$

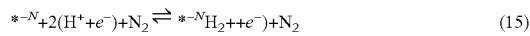
$$*^{-N} + 2(H^+ + e^-) + N_2 \rightleftharpoons *^{-N}H_2 + (H^+ + e^-) + N_2 \quad (15)$$

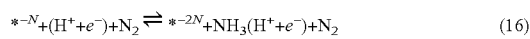
$$*^{-N} + (H^+ + e^-) + N_2 \rightleftharpoons *^{-2N} + NH_3 (H^+ + e^-) + N_2 \quad (16)$$

$$*^{-2N} + N_2 \rightleftharpoons * \quad (17)$$

A completely different reaction mechanism was found for some of the (100) faces of RS structures, such as TiN, TaN, HfN and ScN, where continuous protonation of the surface results in a monolayer coverage contributing to hydrogen evolution rather than ammonia formation (see FIG. 1(b))

In order to find the most promising candidate amongst a wide range of transition metal nitrides, five important criteria were defined by the inventor that must be met by the nitride expected to make ammonia electrochemically at ambient conditions. These criteria are: stability of facets, stability of the vacancy in top layer, catalytic activity, possibility of filling the N-vacancy with nitrogen rather than its poisoning by hydrogen or oxygen from water, and stability of nitrides at the onset potential, respectively.

Stability of Facets

As the first criterion, the stability of nitrides in four facets mentioned earlier was considered. Total energy of slabs was calculated and geometry optimization of the clean surfaces was performed. The stability together with formation energy of different facets was compared to look for the most stable structures. This first criterion eliminates numbers of nitrides that would not be a good catalyst for formation of ammonia owing to instability of the slab and large displacement of surface atoms during energy minimization. 21 nitrides remained out of the initial 104, which are stable in either the (100) facets of RS or the (110) facets of ZB. These nitrides are ScN, TiN, VN, CrN, MnN, CuN, YN, ZrN, NbN, MoN, AgN, HfN, and TaN from the former and FeN, CoN, NiN, RuN, RhN, PdN, OsN and IrN from the latter crystal structure.

Figure 2:
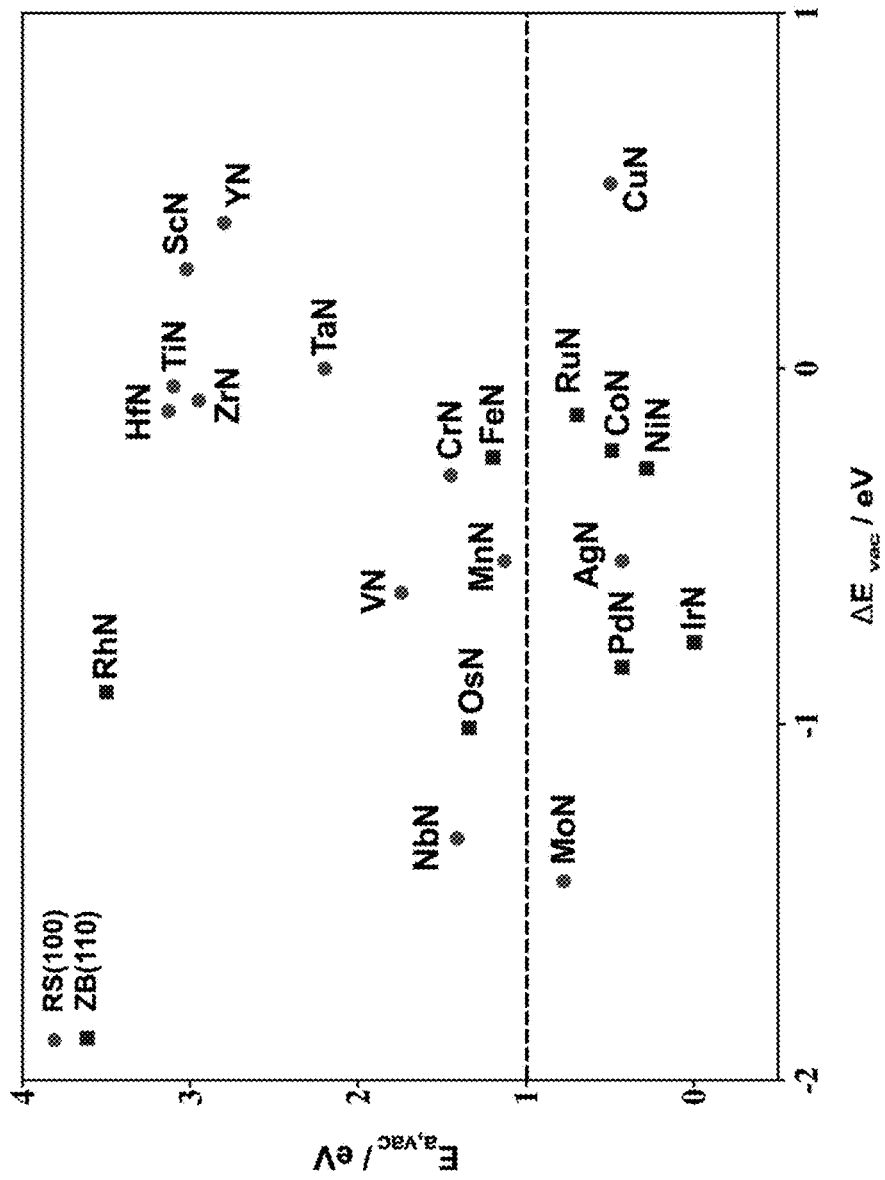
FIG. 2: The activation energy of an N-atom vacancy in top layer to move into the second layer plotted against the reaction energy.

Based on previous work, we consider stability of vacancy in top layer as a crucial factor in search for a good catalyst, a factor that needs to be met by promising candidates expected to make ammonia. Basically, when an N-vacancy is created in the top layer of a nitride, one important question is whether it will be repaired with a $N_2$ molecule or the defect will migrate into the bulk of the crystal. The first step in the migration is displacement from the first layer to the second. If that step is downhill in energy, it is likely that the nitride will eventually be reduced to pure metal and all of the nitrogen in the nitride transformed to ammonia. That being the case, creation of the first N-vacancy and its energy difference to move into the second layer should be a good measure of the stability of the defect at the surface compared to the bulk. Accordingly, the minimum energy configuration of each nitride surface is determined with and without N-vacancy in surface layer and second layer. In the presented study, the energy difference, ΔE, between these two configurations was calculated. That indicates whether the nitride will get reduced to a pure metal through reducing its entire N to ammonia. The energy barrier for an N-atom to move from the second layer to fill a vacancy in the surface layer, i.e. for the N-vacancy to move from the first layer to the second, was also calculated using the nudged elastic band (NEB) method (see FIG. 2). If the energy barrier (activation energy) is high enough, it could prevent migration of a surface vacancy into the crystal even if it is energetically preferable.

The second criterion cut down few more numbers of nitrides from the list of potential candidates for which catalytic studies needs to be carried out. In the coming section, the (100) facets of RS structure of TiN, TaN, ZrN, HfN, ScN, YN, CrN, NbN, MnN and VN together with the (110) facets of ZB structure of FeN, OsN and RhN that were determined, according to the two previous criteria, to be structurally stable and have stable N-vacancy in top layer are considered for electro-catalytic analysis.

Catalytic Activity of Stable Nitrides

Figure 3:
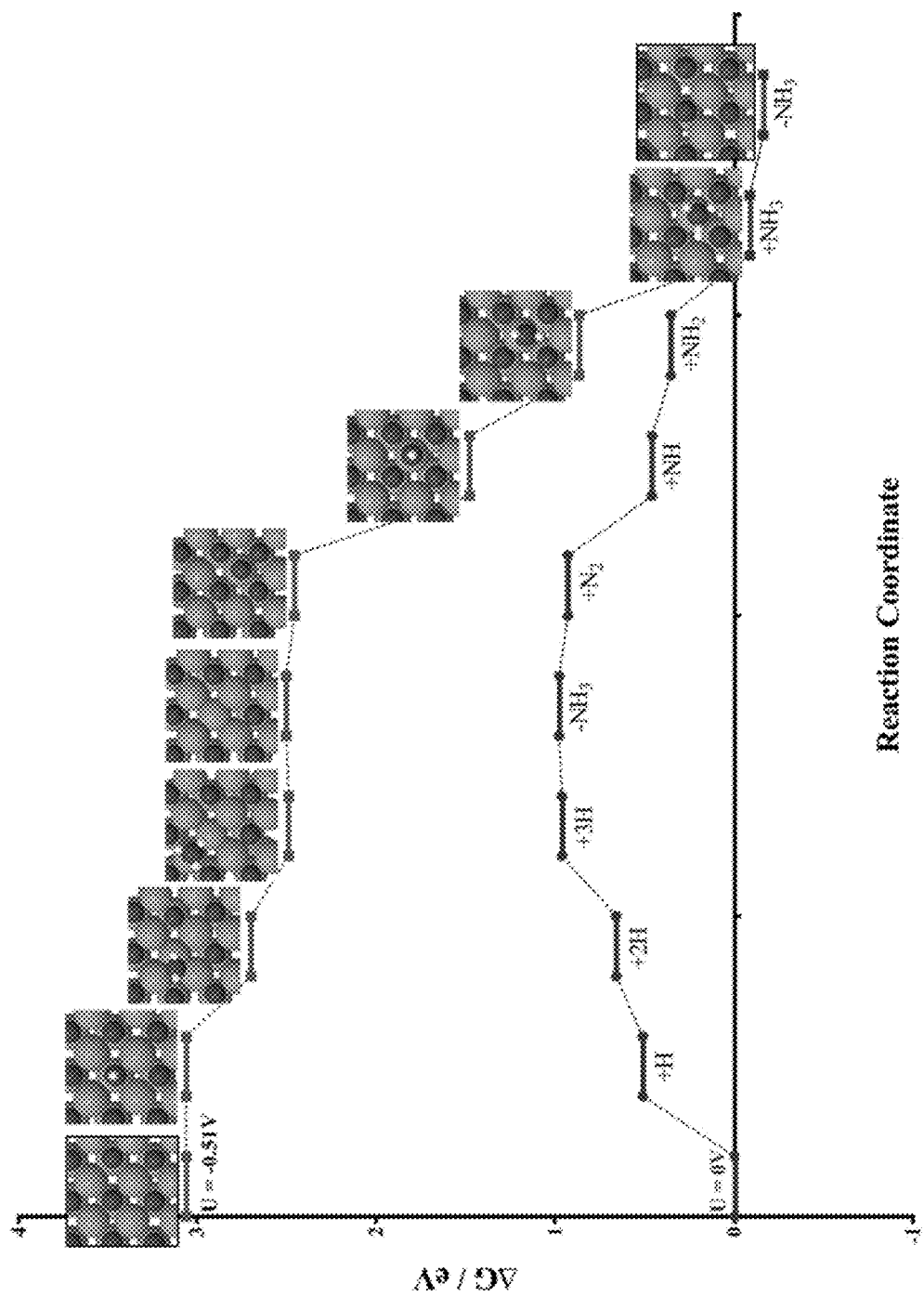
FIG. 3: Free energy diagram for the (100) facets of RS structure of VN. The rate-determining step is addition of the first H to N-atom in the surface layer, with 0.51 eV barriers. The lower curve shows the free energy of all the intermediates calculated at zero potential. The upper curve represents the free energy of all intermediates where the effect of onset potential is also included.

To investigate catalytic activity of the qualified nitrides sifted from the previous steps; the free energy of all intermediates for the reduction of $N_2$ to $NH_3$ was calculated. The reaction mechanism was Mars-van Krevelen summarized in FIG. 1 and Eq. (4)-(10) and (11)-(17). Hydrogen atoms were added one by one to the most stable configuration of the surface and DFT calculations were used to find the minimum energy configurations and binding energies. The minimum energy configurations of adsorbed species are shown in FIG. 1. The free energy was then used as a measure of electro-catalytic activity. The most positive reaction free energy value between any two stable adjacent intermediates for every nitride was determined and that step was indicative of the rate-determining step of the reaction. $-\Delta G$ (the negative of the value of the free energy of the rate-determining step) was the measure of the rate indicating the onset potential for the reaction. DFT calculations showed that the most exergonic step, or the potential-determining step, in reduction of nitrogen to ammonia on the RS (100) VN surface was addition of the first hydrogen to N-adatom towards formation of the first ammonia molecule, being 0.51 eV uphill in free energy (see energy diagram, FIG. 3). To speed up the reaction, thus, onset potential of $-0.51$ V was applied to lower the barrier and make all the other intermediate reactions downhill in free energy. The influence of the applied electric potential was ultimately included according to equation (18) as explained in references 30 and 49. The free energy diagram is illustrated in FIG. 3 where rate-determining step (RDS) and effect of applied bias are taken into account.

Figure 4:
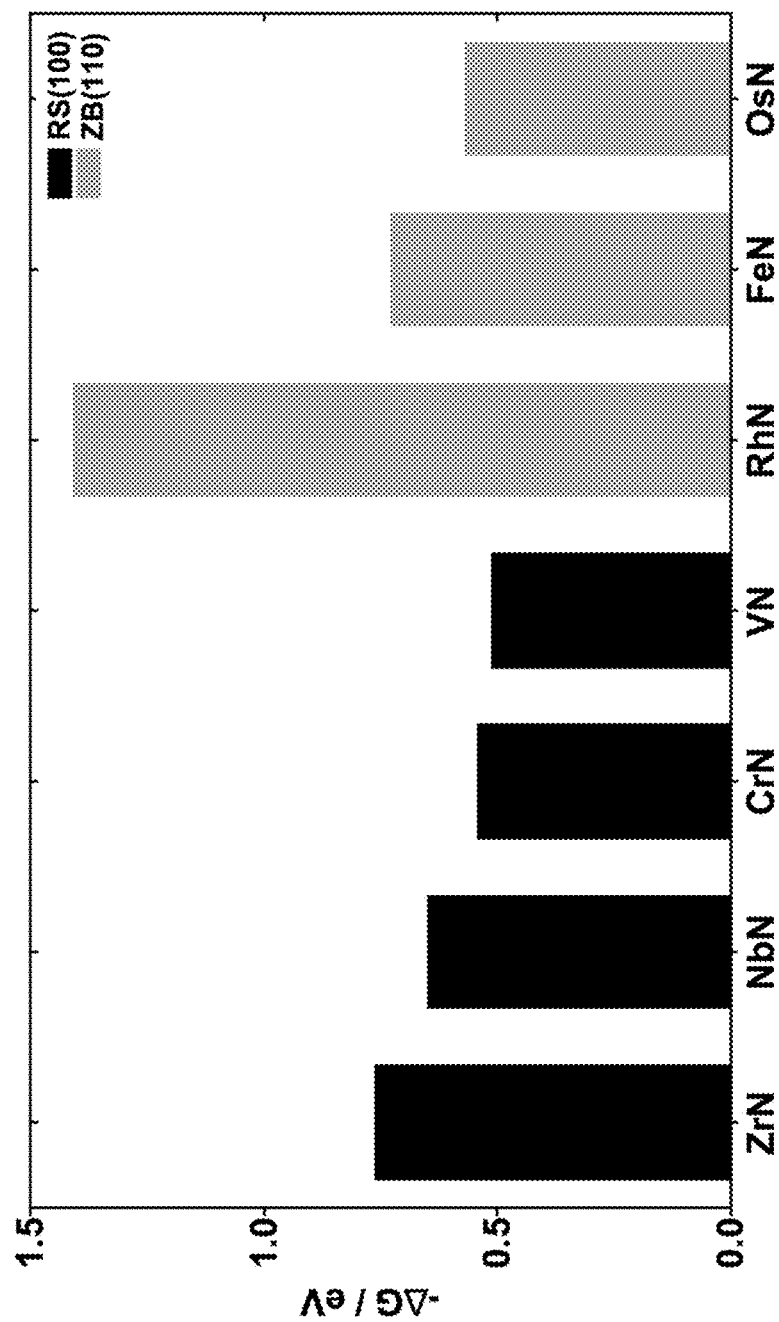
FIG. 4: Onset potentials for the most promising candidates for the reduction of atmospheric nitrogen into ammonia. The onset potential or the catalytic activity ($-\Delta G$) is defined as the reaction free energy of the rate-determining step for any of the elementary steps of the overall reaction. The promising nitrides for ammonia formation are labeled.

Considering the three above-mentioned criteria for the optimum ammonia formation catalyst, in FIG. 4 the electro-catalytic activity is shown in terms of their onset potentials. These nitrides are distinctive because of structural and N-vacancy stability as well as high competency to catalyze reduction of $N_2$ to ammonia. Up to this point, 7 candidates are discovered for producing ammonia electrochemically (FIG. 4). But this is not the end of the story since there are yet two more factors that could influence ammonia formation experimentally.

Adsorption to the N-Vacancy

Despite structural stability, vacancy stability and catalytic activity, the best promising nitride capable of forming ammonia should be the one that its N-vacancy is filled more strongly with nitrogen than hydrogen or oxygen. Otherwise, the catalyst will be poisoned and the cycle of ammonia formation will be ceased. Thus, adsorption energy of these species was calculated by DFT to see whether atmospheric nitrogen binds the N-vacancy strongly enough or either if oxygen or hydrogen poisons the nitrides. FIG. 5 shows adsorption free energy difference of oxygen (referred to $H_2O$) and hydrogen (referred to $H_2$) with respect to nitrogen (referred to $N_2$) to the N-vacancy at the onset potentials required to reduce $N_2$ to $NH_3$ for each nitrides. In all cases, except for RhN, the vacancy will be filled with nitrogen rather than being poisoned by hydrogen or oxygen.

Stability of the Promising Nitrides at Onset Potential

In order to pick up the most appropriate catalyst for successful ammonia formation experimentally, in addition to all the four above-mentioned criteria, the promising candidates have to be stable at the voltage required to cause the reaction, too. If given nitride is decomposed to its pure metal and ammonia during electrochemistry, it is not counted as catalyst making ammonia plausible. Hence, last but not least criterion taken into account in this study is to check the stability of the promising candidates at the bias required to lower the barrier, speed up the reaction and cause the activity. For ZB candidates, except for FeN, no external bias is considered since the rate-determining step corresponding to filling the vacancy is not involved electron-proton transfer. Therefore, we only address the facets (100) of RS of CrN, VN, NbN and ZrN as well as the facets (110) of ZB structure of FeN where the RDS involves protonation of the surface and onset potential is applied to lower such barrier.

The stability of a given nitride with respect to applied voltage is estimated in the following manner. The decomposition of a metal nitride into the corresponding metal and ammonia can be expressed as $$Me_xN_{y(s)} + 3y(H^+) + e^- \rightarrow xMe_{(s)} + yNH_{3(g)} \qquad (19)$$

Where $Me_xN_y$ is the metal nitride of interest and Me the corresponding metal. The overall free energy change of the reaction is given by $$\Delta G_r = y\Delta G_f(NH_{3(g)}) - \Delta G_f(Me_xN_{y(s)}) - 3y\Delta G(H^+/e^-) \qquad (20)$$

where the term for the pure metal is excluded, as it is in its standard state and thus zero. The term $3y\Delta G(H^+/e^-)$ gives the contribution to the free energy by the protons and electrons. To find the applied potential at which the nitride is reduced to the metal, $\Delta G_r$ is needed to be zero, or $$3y\Delta G(H^+/e^-) = y\Delta G_f(NH_{3(g)}) - \Delta G_f(Me_xN_{y(s)}) \qquad (21)$$

Therefore, the required potential can be expressed as:

$$U = -\Delta G(H^+/e^-)/3y \qquad (22)$$

The calculated overpotentials for some of the nitrides are given in Table 2. The free energy of formation of $NH_{3(g)}$ is taken to be $-0.17$ eV[65,66]. All values of $\Delta G_f(Me_xN_{y(s)})$ are taken at 300 K[66-68]. For a given nitride to be useful for electrochemical formation of ammonia, the stability must be equal to or greater than the potential required for ammonia formation. According to the decomposition potential presented in Table 2, only RS ZrN is not going to decompose at the reported bias, a fact that even promotes more the motivation for the experimental study of this promising candidate. However, since the decomposition potential and the onset potential for VN are similar, it is also possible that VN may be able to reduce $N_2$ to $NH_3$. Finally, this analysis has not been extended to NbN or FeN, so it is possible they could as well be promising candidates.

TABLE 2

| | Decomposition of Nitride | | | Onset potential V | |
| --- | --- | --- | --- | --- | --- |
| Nitride | $\Delta G_f$ $(Me_xN_{y(s)})$/eV | $\Delta G$ $(H^+/e^-)$/eV | U/V | RS (100) | ZB (110) |
| $Mo_2N$ | $-0.50$ | 0.33 | 0.04 | $-0.55^a$ | — |
| CrN | $-0.89$ | 0.72 | $-0.24$ | $-0.53$ | — |
| VN | $-1.56$ | 1.39 | $-0.46$ | $-0.51$ | — |
| ZrN | $-3.25$ | 3.08 | $-1.03$ | $-0.76$ | — |
| NbN | — | — | — | $-0.65$ | — |
| FeN | — | — | — | — | $-0.75$ |

Table 2 shows calculated potentials required for the conversion of a metal nitride to the corresponding metal, according to Eq. 19. $\Delta G_f(Me_xN_{y(s)})$ is from Ref[67,68]. Also included are the calculated onset potentials required for ammonia formation.

For a transition metal nitride to be a suitable candidate for electrochemical reduction of $N_2$ to ammonia at ambient conditions, structural stability, electrochemical activity, stability with respect to defect mobility, repairing the N-vacancy preferably with nitrogen, and stability of the nitride at onset potential were investigated as five crucial factors in this study. The final result is therefore that the most promising nitride slabs are the (100) facets of RS ZrN as it requires a low overpotential (−0.76 V vs. NHE) to reduce $N_2$ and the N-vacancy is thermodynamically stable in top layer.

According to our catalytic estimates and from the experimental point of view, a potential of −0.53 V needs to be applied on CrN to keep reducing nitrogen to ammonia but if the potential goes below −0.24 V, the nitride becomes unstable and could decompose. However kinetics might avoid it since the N-vacancy migration from surface to the bulk encounters activation barrier around 1.5 eV (see FIG. 2). VN should be even more stable in this regard since −0.51 V is needed to make the reaction run while applied potential could get even lower to −0.46 V before the nitride decomposes. Besides, higher barrier of 1.8 eV is needed for migration of its vacancy into the bulk. ZrN could be the most stable nitride with respect to decomposition. Because not it only has 0.3 V margin of safety until its decomposition occurs at potential below −1.03 V, but it also has huge barrier of approximately 3 eV for the vacancy to migrate into the bulk.

CONCLUSIONS

A theoretical analysis of the possibility of forming ammonia electrochemically under ambient conditions on transition metal nitride electrodes discovers propitious candidates that are capable of reducing surface nitrogen to ammonia at low potential around −0.51 V to −0.76 V with respect to NHE through Mars-van Krevelen mechanism. The proposed onset potential for electrochemical ammonia production on the (100) facets of RS structure of CrN, VN and ZrN is −0.53 V, −0.51 V and −0.76 V with respect to NHE, respectively. Using the (110) facets of ZB structure of FeN as cathode electrode, −0.75 V is required to produce ammonia. From the latter structure, RhN and OsN could also reduce surface nitrogen to ammonia. But they should need higher temperature to speed up the reaction and higher pressures to fill the N-vacancy in order to make ammonia electrochemically. In contrast with previous studies where hydrogen evolution reaction (HER) was a competing reaction[50] or the potential forcing the ammonia formation was reported to be relatively high[49], the most promising candidates presented in this paper need lower potential to cause the reaction. Besides, they can hinder HER and still be very good catalysts for $NH_3$ production. So hydrogen formation should no longer interfere reduction of $N_2$ to $NH_3$. Therefore, a significant amount of ammonia compared with hydrogen gas can be expected. Furthermore, for the most promising candidates of this study at the limiting potential, the N-vacancy is stable towards both protonation and oxidation from water and it should get easily repaired with atmospheric nitrogen injected to the system at atmospheric pressure. Plus, the presented catalysts do not get decomposed to their corresponding metals at the proposed onset potentials. This does indeed strengthen the idea that discovered nitrides in this study are worthwhile candidates should be experimentally tested for ammonia formation.

REFERENCES

1. Schlögl, R. Catalytic synthesis of ammonia—"a never-ending story"? *Angew. Chem. Int. Ed. Engl.* 42, 2004-2008 (2003).
2. Klerke, A., Christensen, C. H., Nørskov, J. K. & Vegge, T. Ammonia for hydrogen storage: challenges and opportunities. *J. Mater. Chem.* 18, 2304 (2008).
3. Smil, V. Global population and the nitrogen cycle. *Sci. Am.* 277, 76-81 (1997).
4. Jennings, J. R. *Catalytic ammonia synthesis: fundamentals and practice.* (Springer, 1991).
5. Benefits, S. How a century of ammonia synthesis changed the world. 1, (2008).
6. Aika, K. & Tamara, K. in *Ammonia* 103-148 (Springer, 1995).
7. Ertl, G. Primary steps in catalytic synthesis of ammonia. *J. Vac. Sci. Technol. A Vacuum, Surfaces, Film.* 1, 1247 (1983).
8. Ertl, G. Reactions at surfaces: From atoms to complexity (Nobel lecture). *Angew. Chemie Int. Ed.* 47, 3524-3535 (2008).
9. Spencer, N. D., Schoonmaker, R. C. & Somorjai, G. A. Iron single crystals as ammonia synthesis catalysts: effect of surface structure on catalyst activity. *J. Catal.* 74, 129-135 (1982).
10. Stoltze, P. & Nørskov, J. Bridging the "Pressure Gap" between ultrahigh-vacuum surface physics and high-pressure catalysis. *Phys. Rev. Lett.* (1985).
11. Honkala, K. et al. Ammonia synthesis from first-principles calculations. *Science* 307, 555-558 (2005).
12. Dahl, S. et al. Role of steps in N2 activation on Ru(0001). *Phys. Rev. Lett.* 83, 1814-1817 (1999).
13. Dahl, S., Törnqvist, E. & Chorkendorff, I. Dissociative adsorption of N 2 on ru (0001): A surface reaction totally dominated by steps. *J. Catal.* 390, 381-390 (2000).
14. Jacobsen, C., Dahl, S. & Hansen, P. Structure sensitivity of supported ruthenium catalysts for ammonia synthesis. *Mol. Catal. A* 163, 19-26 (2000).
15. Kästner, J. & Blöchl, P. E. Ammonia production at the FeMo cofactor of nitrogenase: results from density functional theory. *J. Am. Chem. Soc.* 129, 2998-3006 (2007).
16. Howard, J. B. & Rees, D. C. Overview of biological nitrogen fixation. 103, 17088-17093 (2006).
17. Burgess, B. K. & Lowe, D. J. Mechanism of Molybdenum nitrogenase. *Chem. Rev.* 96, 2983-3012 (1996).
18. Marnellos, G. Ammonia synthesis at atmospheric pressure. *Science (80-.).* 282, 98-100 (1998).
19. Marnellos, G., Karagiannakis, G., Zisekas, S. & Stoukides, M. Electrocatalytic synthesis of ammonia at atmospheric pressure. *Stud. Surf Sci. Catal.* 130, 413-418 (2000).
20. Kordali, V., Kyriacou, G. & Lambrou, C. Electrochemical synthesis of ammonia at atmospheric pressure and low temperature in a solid polymer electrolyte cell. *Chem. Commun.* 1673-1674 (2000). doi:10.1039/b004885m
21. Murakami, T., Nishikiori, T., Nohira, T. & Ito, Y. Electrolytic synthesis of ammonia in molten salts under atmospheric pressure. *J. Am. Chem. Soc.* 125, 334-335 (2003).
22. Pappenfus, T. M., Lee, K., Thoma, L. M. & Dukart, C. R. Wind to ammonia: Electrochemical processes in room temperature ionic liquids. *ECS Trans.* 16, 89-93 (2009).
23. Amar, I. a., Lan, R., Petit, C. T. G., Arrighi, V. & Tao, S. Electrochemical synthesis of ammonia based on a carbonate-oxide composite electrolyte. *Solid State Ionics* 182, 133-138 (2011).
24. Marnellos, G. Synthesis of ammonia at atmospheric pressure with the use of solid state proton conductors. *J. Catal.* 193, 80-87 (2000).
25. Denvir, A. & Murphy, O. Electrochemical synthesis of ammonia. WO Pat. 2, (2003).
26. Ouzounidou, M., Skodra, a, Kokkofitis, C. & Stoukides, M. Catalytic and electrocatalytic synthesis of NH3 in a H+ conducting cell by using an industrial Fe catalyst. *Solid State Ionics* 178, 153-159 (2007).

27. Song, Z., Cai, T., Hanson, J. C., Rodriguez, J. A. & Hrbek, J. Structure and reactivity of Ru nanoparticles supported on modified graphite surfaces: A study of the model catalysts for ammonia synthesis. *J. Am. Chem. Soc.* 126, 8576-8584 (2004).
28. Studt, F. & Tuczek, F. Energetics and Mechanism of a Room-Temperature Catalytic Process for Ammonia Synthesis (Schrock Cycle): Comparison with Biological Nitrogen Fixation. *Angew. Chemie Int. Ed.* 44, 5639-5642 (2005).
29. Logadottir, a. The Brønsted-Evans-Polanyi relation and the volcano plot for ammonia synthesis over transition metal catalysts. *J. Catal.* 197, 229-231 (2001).
30. Nørskov, J. K. et al. Origin of the overpotential for oxygen reduction at a fuel-cell cathode. *J. Phys. Chem. B* 108, 17886-17892 (2004).
31. Rod, T. H., Logadottir, a. & Nørskov, J. K. Ammonia synthesis at low temperatures. *J. Chem. Phys.* 112, 5343 (2000).
32. Hellman, a et al. Predicting catalysis: understanding ammonia synthesis from first-principles calculations. *J. Phys. Chem. B* 110, 17719-17735 (2006).
33. Lin, B. & Wei, K. Carbon-supported Ru catalyst with lithium promoter for ammonia synthesis. *Catal. Commun.* 41, 110-114 (2013).
34. Pickett, C. & Talarmin, J. Electrosynthesis of ammonia. *Nature* 317, 652-653 (1985).
35. Chatt, J., Pearman, A. & Richards, R. The reduction of mono-coordinated molecular nitrogen to ammonia in a protic environment. *Nature* 253, 39-40 (1975).
36. Lowe, D. & Thorneley, R. The mechanism of *Klebsiella pneumoniae* nitrogenase action. The determination of rate constants required for the simulation of the kinetics of N2 reduction and H2 evolution. *Biochem. J* 224, 895-901 (1984).
37. Toth, L. *Transition metal carbides and nitrides*. (Academic press, 1971).
38. Ojha, P., Aynyas, M. & Sanyal, S. P. Pressure-induced structural phase transformation and elastic properties of transition metal mononitrides. *J. Phys. Chem. Solids* 68, 148-152 (2007).
39. Brik, M. G. & Ma, C.-G. First-principles studies of the electronic and elastic properties of metal nitrides XN (X=Sc, Ti, V, Cr, Zr, Nb). *Comput. Mater. Sci.* 51, 380-388 (2012).
40. Allen, A. D. & Senoff, C. V. Nitrogenopentammineruthenium(II) complexes. *Chem. Commun.* 2, 621 (1965).
41. Vol'pin, M. E. & Shur, V. B. Nitrogen fixation by transition metal complexes. *Nature* 1236 (1966).
42. Gambarotta, S. & Scott, J. Multimetallic cooperative activation of N2. *Angew. Chem. Int. Ed. Engl.* 43, 5298-308 (2004).
43. Hidai, M. & Mizobe, Y. Research inspired by the chemistry of nitrogenase Novel metal complexes and their reactivity toward dinitrogen, nitriles, and alkynes. *Can. J. Chem.* 83, 358-374 (2005).
44. Studt, F. & Tuczek, F. Theoretical, spectroscopic, and mechanistic studies on transition-metal dinitrogen complexes: implications to reactivity and relevance to the nitrogenase problem. *J. Comput. Chem.* 27, 1278-1291 (2006).
45. Himmel, H.-J. & Reiher, M. Intrinsic dinitrogen activation at bare metal atoms. *Angew. Chem. Int. Ed. Engl.* 45, 6264-6288 (2006).
46. Ballmann, J., Munhá, R. F. & Fryzuk, M. D. The hydride route to the preparation of dinitrogen complexes. *Chem. Commun. (Camb)*. 46, 1013-1025 (2010).
47. Hinrichsen, S., Broda, H., Gradert, C., Söncksen, L. & Tuczek, F. Recent developments in synthetic nitrogen fixation. *Annu. Reports Sect. "A" (Inorganic Chem.* 108, 17 (2012).
48. Nishibayashi, Y. Molybdenum-catalyzed reduction of molecular dinitrogen under mild reaction conditions. *Dalton Trans.* 41, 7447-7453 (2012).
49. Skúlason, E. et al. A theoretical evaluation of possible transition metal electro-catalysts for $N_2$ reduction. *Phys. Chem. Chem. Phys.* 14, 1235-1245 (2012).
50. Howalt, J. G., Bligaard, T., Rossmeisl, J. & Vegge, T. DFT based study of transition metal nano-clusters for electrochemical $NH_3$ production. *Phys. Chem. Chem. Phys.* 15, 7785-7795 (2013).
51. Howalt, J. G. & Vegge, T. Electrochemical ammonia production on molybdenum nitride nanoclusters. *Phys. Chem. Chem. Phys.* 1-25 (2013).
52. Mars, P. & Van Krevelen, D. W. special supplement to Chem. Eng. Sci 3, 41 (1954).
53. Hohenberg, P. & Kohn, W. Inhomogeneous Electron Gas. *Phys. Rev.* 155, (1964).
54. Kohn, W. & Sham, L. Self-Consistent Equation Including Exchange and Correlation Effect. *Phys. Rev.* 385, (1965).
55. Hammer, B., Hansen, L. & Nørskov, J. Improved adsorption energetics within density-functional theory using revised Perdew-Burke-Ernzerhof functionals. *Phys. Rev. B* 59, 7413-7421 (1999).
56. Kresse, G. & Furthmüller, J. Efficiency of ab-initio total energy calculations for metals and semiconductors using a plane-wave basis set. *Comput. Mater. Sci.* 6, 15-50 (1996).
57. Kresse, G. & Furthmüller, J. Efficient iterative schemes for ab initio total-energy calculations using a plane-wave basis set. *Phys. Rev. B. Condens. Matter* 54, 11169-11186 (1996).
58. Blöchl, P. Projector augmented-wave method. *Phys. Rev. B* 50, 17953-17979 (1994).
59. Kresse, G. & Hafner, J. Ab. initio molecular dynamics for liquid metals. *Phys. Rev. B* 47, 558-561 (1993).
60. Kresse, G. & Hafner, J. Ab initio molecular-dynamics simulation of the liquid-metal-amorphous-semiconductor transition in germanium. *Phys. Rev. B* 49, (1994).
61. Henkelman, G., Uberuaga, B. P. & Jónsson, H. A climbing image nudged elastic band method for finding saddle points and minimum energy paths. *J. Chem. Phys.* 113, 9901 (2000).
62. Henkelman, G. & Jónsson, H. Improved tangent estimate in the nudged elastic band method for finding minimum energy paths and saddle points. *J. Chem. Phys.* 113, 9978 (2000).
63. Monkhorst, H. & Pack, J. Special Points for Brillouin-zone integrations. *Phys. Rev. B* 13, 5188-5192 (1976).
64. Heyrovský, J. A theory of overpotential. *Recl. des Trav. Chim. des Pays-Bas* 179, 44-47 (1927).
65. Darrell D. Ebbing, S. D. G. *General Chemistry, Enhanced Edition*. 746 (Charles Hartford, 2010).
66. Lide, D. R. *CRC Handbook of Chemistry and Physic*. (1997).
67. Rao, Y. K. *Stoichiometry and Thermodynamics of Metallurgical Processes*. (Chambridge University Press, 1985).
68. Reed, T. B. *Free energy of formation of binary compounds: an atlas of charts for high-temperature chemical calculations*. (MIT Press Cambridge, Mass., 1971).
69. Hlynsson, V. F., Skúlason, E. & Garden, A. L. A systematic, first-principles study of the structural preference and magnetic properties of mononitrides of the d-block metals. *J. Alloys Compd.* 603, 172-179 (2014).

Example 2

Further DFT calculations were performed accordingly to the methodology described in the above under Example 1. The free energy change of the RDS of several nitrides was determined, as shown in FIG. 6. Most of the nitrides exhibit relatively high activity towards ammonia formation, with the exception of ScN, YN and HfN, which have $\Delta G_{RDS} > 1.5$ eV. All of the nitrides with $\Delta G_{RDS} \leq 1.5$ eV are considered potentially active and are retained for a more detailed mechanistic study.

An interesting point to note is that there is no clear trend in the nature of the RDS; for some nitrides the addition of the first proton is rate-limiting, while for others the addition of the third, fourth, or fifth proton is rate-limiting while for some it is the release of the ammonia molecule which is the RDS. This is in contrast to the case of electrochemical ammonia formation on pure metals, for which primarily only two different RDS exist across the whole series of pure transition metal surfaces. That results in a volcano-shaped activity curve when plotted against a common descriptor. Here, we do not observe any linear relation with a common descriptor and since there is no trend in the RDSs, a volcano plot analysis is difficult and all elementary steps for all nitrides need to be calculated explicitly.

For those nitrides that exhibit reasonable catalytic activity when H adsorption is constrained to a single N atom, an unconstrained mechanism is considered. In this approach, at each H addition step every possible adsorption site is investigated, including other N atoms, metal atoms and bridging sites. DFT is used to evaluate the most stable adsorption site at each step. Free energy diagrams for $NH_3$ formation via this unconstrained mechanism are shown in FIG. 7 for the (100) facet of RS structure of ZrN (a) as well as the (110) facet of ZB structure of OsN (b) and the remainder are given in the supplementary deposit.

For VN, CrN and RuN, the mechanism is found to be identical to the constrained mechanism, where each added H adds to the same N atom, forming one $NH_3$, then the second, with only $6(H^+ + e^-)$ required to form $2NH_3$. For ZrN, (FIG. 7a), allowing the H to bind to any surface site results in firstly a surface Zr atom being protonated, and then an N atom. The protonation of N is the RDS in $NH_3$ formation, similar to the constrained mechanism. However, the presence of an H atom on the adjacent Zr atom lowers the free energy of *NH formation by 0.23 eV. A similar case is seen for NbN, where two neighbouring Nb atoms are protonated before the RDS, which is protonation of the first surface N. The free energy of the RDS is lowered by 0.29 eV due to the H coverage on the Nb. For OsN and MnN the unconstrained mechanism leads to a different RDS and a different reaction path than when a constrained mechanism is considered. For MnN, $3(*NH_2)$ and $1(*NH)$ form before the first ammonia is released and $9(H^+ + e^-)$ are needed to form $2NH_3$. In this case, no metal atoms are protonated. In contrast, for OsN, (FIG. 7b), H atoms cover all the metal atoms on the surface as well as surface N atoms and $13(H^+ + e^-)$ are needed to form $2NH_3$. For OsN addition of $N_{2(g)}$ to fill the N-vacancy is endothermic, which corresponds to an increase in free energy that cannot be surpassed by an external applied bias as no proton-electron transfer is involved at this step.

An interesting trend that is observed from comparison of the constrained and unconstrained mechanisms is that for RS nitrides, a relatively low coverage of H is required to make $2NH_3$. Furthermore, additional H atoms generally add to neighbouring metal atoms, rather than other N atoms, which lowers $\Delta G_{RDS}$ by ~0.05-0.3 eV, relative to the constrained mechanism. In contrast, for ZB nitrides, a higher coverage of H is needed to form $2NH_3$. The result of this is that $\Delta G_{RDS}$ is increased by ~0.12 eV, relative to the constrained mechanism. For such cases that require more than the minimum $6(H^+ + e^-)$ to form $2NH_3$, a lower faradaic efficiency is likely to be observed. For TiN and TaN an unconstrained mechanism yields a full H coverage on the surface with no $NH_3$ formation. The catalytic activity of these nitrides are thus instead being considered as potential hydrogen evolution catalysts, the results of which are beyond the scope of the present study.

After exclusion of those nitrides that either do not form $NH_3$ (TiN and TaN) or have an onset potential of >1.5 V (ScN, YN and HfN), eight metal nitride catalysts are considered potentially active towards $NH_3$ formation and presented in FIG. 8. The six RS nitrides as well as RuN ZB should make ammonia electrochemically under ambient conditions whereas ZB OsN likely requires high pressure to fill the N-vacancy in order to complete the catalytic cycle of ammonia formation.

Example 3

The usefulness of VN catalyst in the preparation of ammonia was tested in an electrolytic cell. The experiment was done with atmospheric air (78% $N_2$) and water as reactants, where the aqueous solution included a 0.05 M $H_2SO_4$ electrolyte. The measurements were done at room temperature and atmospheric pressure. The applied potential was controlled with a potentiostat. The working electrode is one of the promising candidates from the DFT calculations, VN, whereas the counter electrode was Pt and the reference electrode was Ag—AgCl electrode. Reported voltage has been converted so as to be on the reversible hydrogen electrode (RHE) scale. Results are shown in Table 3. As can be seen, the VN catalyst led to the formation of ammonia at ambient temperature and pressure, in very high yield, and at a low applied voltage of −0.3 V vs. RHE. The abundant reactants and the conditions used here will make it easily commersialized in a small-scale and decentralized device and the high yields and low applied potential are promising. An increase in rate from $10^{-12}$ mole/cm's to $10^{-9}$ mole/$cm^2$s or by three orders of magnitude would facilitate the use of the system in practical settings. This can be achieved with further improvements of the catalyst and improved conductance of electrons to the surface.

TABLE 3

The VN catalyst tested experimentally with air and water as reactants in a $H_2SO_4$ electrode at ambient conditions.

| Catalyst | Reagents | Electrolyte | T (° C.) | P (bar) | Rate of $NH_3$ formation (mole/$cm^2 \cdot s$) | Yield (%) | Voltage vs. RHE |
|---|---|---|---|---|---|---|---|
| VN | Air, water | $H_2SO_4$ | 25 | 1 | $10^{-12}$ | 91 | −0.3 |

Example 4

DFT Calculations
The results presented here were calculated with DFT using the RPBE exchange correlation functional[42]. The ionic cores and their interaction with the valence electrons were described by PAW treatment of core electrons[43] as implemented in the Vienna Ab initio Simulation Package (VASP) code[44-47]. The valence wave functions were expanded in a basis set of plane waves with an energy cut-off of 350 eV. The electron density of the valence states was obtained by a self-consistent iterative diagonalization of the Kohn-Sham Hamiltonian, with the occupation of the Kohn-Sham states being smeared according to a Fermi-Dirac distribution with a smearing parameter of $k_BT=0.1$ eV. Activation energies were calculated as the highest point along the minimum energy path (MEP) acquired using the climbing image nudged elastic band method (CI-NEB)[48,49]. The Brillouin zone of the systems was sampled with a 4×4×1 Monkhorst-Pack mesh.

Mononitrides of Zr, Nb, Cr and V were considered in both the RS and ZB structures in the present study, as they previously found very promising for electrochemical ammonia formation (see Example 1). Two low index facets were considered for each crystal structure, the (100) and (111) facets of the RS structure and the (100) and (110) facets of the ZB structure. 40 atoms in five layers, with each layer consisting of four metal atoms and four nitrogen atoms were used to model each nitride surfaces. The bottom two layers were fixed whereas the adsorbate(s) together with the three topmost layers of the nitrides were allowed to fully relax. Boundary conditions were periodic in the x and y directions and surfaces were separated by 12 Å of vacuum in the z direction. The structural optimization was considered converged when the forces in any direction on all moveable atoms were less than 0.01 eV/Å. Spin magnetic moments for VN and CrN were taken into account according to the same study from which the RPBE lattice constants were taken[50].

Electrochemical Reactions and Modeling

Mars-Van Krevelen (MVK) Mechanism

Firstly, the heterogeneous MVK-type mechanism is considered where $NH_3$ molecule is formed from a surface N atom and a N-vacancy is created before regenerating the catalyst with gaseous $N_2$. The cathode reaction of the electrochemical process is:

$$N_2 + 6(H^+e^-) \rightleftharpoons 2NH_3 \quad (1)$$

The source of protons is taken to be the anode reaction[51]:

$$H_2 \rightleftharpoons 2(H^+e^-) \quad (2)$$

Hydrogenation of the surface is carried out by adding H atoms one-by-one to the surface to represent a proton from the solution and an electron from the electrode surface. There are three possible MVK mechanisms under consideration in this study, dissociative single-vacancy, dimer-vacancy and associative single-vacancy approach. The reaction mechanism is firstly investigated based on dissociative single-vacancy approach for all the nitrides according to Eqns. (3)-(11).

$$*+6(H^++e^-)+N_2 \rightleftharpoons *H+5(H^++e^-)+N_2 \quad (3)$$

$$*H+5(H^++e^-)+N_2 \rightleftharpoons *2H+4(H^++e^-)+N_2 \quad (4)$$

$$*2H+4(H^++e^-)+N_2 \rightleftharpoons *NH_3+3(H^++e^-)+N_2 \quad (5)$$

$$*NH_3+3(H^++e^-)+N_2 \rightleftharpoons *^{-N}+NH_3+3(H^++e^-)+N_2 \quad (6)$$

$$*^{-N}+3(H^++e^-)+N_2 \rightleftharpoons *N_{vac}+*N_{metal}+3(H^++e^-) \quad (7)$$

$$*N_{metal}+3(H^++e^-) \rightleftharpoons *NH+2(H^++e^-) \quad (8)$$

$$*NH+2(H^++e^-) \rightleftharpoons *NH_2+(H^++e^-) \quad (9)$$

$$*NH_2+(H^++e^-) \rightleftharpoons *NH_3 \quad (10)$$

$$*NH_3 \rightleftharpoons *+NH_3 \quad (11)$$

An asterisk, *, represents a site on the surface. A N-vacancy in the surface layer is denoted as $*^{-N}$. $*N_{vac}$ and $*N_{metal}$ indicate the N-adatom filling the N-vacancy and adsorbing the neighboring metal atom, respectively. If addition of $N_2$ to fill the vacancy is found to be an endothermic step, the second approach will be considered where after formation of the first $NH_3$ protonation of the surface is continued to form the second $NH_3$ and a dimer-vacancy is left. Addition of $N_2$ to replenish the dimer-vacancy should be an exothermic step. The mechanism for a dimer-vacancy approach is given in Eqns. (12)-(20).

$$*+6(H^++e^-)+N_2 \rightleftharpoons *H+5(H^++e^-)+N_2 \quad (12)$$

$$*H+5(H^++e^-)+N_2 \rightleftharpoons *2H+4(H^++e^-)+N_2 \quad (13)$$

$$*2H+4(H^++e^-)+N_2 \rightleftharpoons *NH_3+3(H^+e^-)+N_2 \quad (14)$$

$$*NH_3+3(H^++e^-)+N_2 \rightleftharpoons *^{-N}+NH_3+3(H^++e^-)+N_2 \quad (15)$$

$$*^{-N}+3(H^++e^-)+N_2 \rightleftharpoons *^{-N}+*H+2(H^++e^-)+N_2 \quad (16)$$

$$*^{-N}+*H+2(H^++e^-)+N_2 \rightleftharpoons *^{-N}+*2H+(H^++e^-)+N_2 \quad (17)$$

$$*^{-N}+*2H+(H^++e^-)+N_2 \rightleftharpoons *^{-N}+*NH_3+N_2 \quad (18)$$

$$*^{-N}+*NH_3+N_2 \rightleftharpoons *^{-2N}+NH_3+N_2 \quad (19)$$

$$*^{-2N}+N_2 \rightleftharpoons * \quad (20)$$

A dimer-vacancy in the surface layer is denoted as $*^{-2N}$. In case of slow and difficult completion of the catalytic cycle at ambient conditions due to large kinetics barrier of $N_2$ splitting on either single- or dimer-vacancies, the possibility of associative single-vacancy MVK mechanism is investigated. The mechanism for an associative single-vacancy approach is given in Eqns. (21)-(29).

$$*+6(H^++e^-)+N_2 \rightleftharpoons *H+5(H^++e^-)+N_2 \quad (21)$$

$$*H+5(H^++e^-)+N_2 *2H+4(H^++e^-)+N_2 \quad (22)$$

$$*2H+4(H^++e^-)+N_2 \rightleftharpoons *NH_3+3(H^++e^-)+N_2 \quad (23)$$

$$*NH_3+3(H^++e^-)+N_2 \rightleftharpoons *^{-N}+NH_3+3(H^++e^-)+N_2 \quad (24)$$

$$*^{-N}+3(H^++e^-)+N_2 \rightleftharpoons *N_{2\,on\,vac}+3(H^++e^-) \quad (25)$$

$$*N_{2\,on\,vac}3(H^++e^-) \rightleftharpoons *NNH+2(H^++e^-) \quad (26)$$

$$*NNH+2(H^++e^-) \rightleftharpoons *NNH_2+(H^++e^-) \quad (27)$$

$$*NNH_2+(H^++e^-) \rightleftharpoons *NNH_3 \quad (28)$$

$$*NNH_3 \rightleftharpoons *N_{on\,vac}+NH_3 \quad (29)$$

An asterisk denotes a site on the surface. $*N_{2\,on\,vac}$ represents $N_2$ associatively bind the N-vacancy and *NNH denotes protonation of the outermost N of $N_2$ filling the N-vacancy. DFT calculations are used to calculate the minimum energy configuration of each species on the surface and to calculate adsorption energies of all intermediates according to reactions (3)-(29). Various surface sites are considered and the optimal binding site is identified. It is assumed that activation barriers between stable minima can be neglected during the electrochemical reactions. The free energy of each elementary step and the change in free energy at zero potential is estimated at pH=0 according to:

$$\Delta G = \Delta E + \Delta E_{ZPE} - T\Delta S \quad (30)$$

where $\Delta E$ is the reaction energy calculated using DFT. The zero-point energy correction ($\Delta E_{ZPE}$) and entropy difference ($\Delta S$) are calculated for the adsorbed species using the vibrational frequencies obtained from a normal mode analysis. Gas phase values are taken from standard molecular tables[52]. By the use of the computational standard hydrogen electrode[51], the chemical potential for (H$^+$+e$^-$) is related to that of 1/2H$_2$(g) and the free energy difference for the reaction *A+(H$^+$+e$^-$)→*AH is, under standard conditions, calculated as the free energy change for the reaction *A+1/2H$_2$→*AH. The effect of an applied bias, U, is included for all electrochemical reaction steps by shifting the free energy for reactions involving n electrons by −neU:[51]

$$\Delta G = \Delta E + \Delta E_{ZPE} - T\Delta S - neU \quad (31)$$

Explicit inclusion of a water layer[53] has not been considered in the present work due to the large computational effort required. It has been shown that the presence of water may help stabilize some species more than others via hydrogen bonding. For example, *NH is expected to be stabilized slightly by hydrogen bonding, while the effect of the water layer on *N will be negligible. The effect of hydrogen-bond stabilization of the adsorbates has been estimated in a previous publication[31]. A relatively small correction for the N—H bonds was found of around 0.08 eV per H-bond. From this, we conclude that the onset potentials calculated in the present study are likely to change by a similar magnitude, that is, less than 0.1 eV. Thus the correction is not done in the present study.

Results and Discussions

In our previous effort of the most stable facets and consideration of a MVK mechanism, 4 promising candidates were introduced for high-yield electrochemical N$_2$ reduction to NH$_3$ at ambient conditions (Example 1). Analyses of some facets of these were skipped due to lower stability. However, there may be some structures/facets that are extremely good in activity, but not the most stable facet. Therefore, the reactivity of these facets of nitride catalysts towards fixation of molecular nitrogen deserves detailed analysis. In the following subsections, the MVK mechanism (both single- and dimer-vacancy approach) is studied for the new facets and their reactivity towards nitrogen reduction is compared to the (100) facets of RS. Then other possible mechanisms and pathways are addressed for electrochemical ammonia formation on these facets including the (100) facets of RS such as associative, dissociative and mixed associative-dissociative mechanisms.

Catalytic Activity

DFT calculations is used to investigate the reactivity of different facets of the nitride candidates towards reduction of nitrogen to ammonia by evaluating the most stable adsorption site at each H addition step where every possible adsorption site is inspected, including other N atoms, metal atoms and bridging sites. The free energy of all intermediates is calculated according to Eqn. (30), with reference to N$_2$ and H$_2$ in the gas phase. Initially, the feasibility of the MVK mechanism is scrutinized through dissociative single-vacancy approach according to Eqns. (3)-(11). Wherever this approach seems blocking or slowing down the catalytic cycle at ambient conditions due to either endothermic step for filling N-vacancy or N$_2$ desorption from it, the possibility of either dissociative dimer-vacancy MVK [according to Eqns. (12)-(20) shown in FIG. 9 on the RS(111) and ZB(100/110) of VN] or associative single-vacancy MVK [according to Eqns. (21)-(29) shown in FIG. 10 on the RS(111) of ZrN] is investigated. Thus, three approaches are considered for each surface and the more favorable one is selected to proceed with. In FIG. 9, the free energy diagrams for VN in two crystal structures and four different facets is constructed at zero potential through MVK mechanism. The single-vacancy approach is more favorable for the RS(100) of VN; whereas, the dimer-vacancy approach is more dominant for its other facets. In addition to different proton-electron pairs required for the catalytic cycle of 2NH$_3$ formation, another difference observed from comparison of single- and dimer-vacancy approach is the thermochemical dissociation of the N≡N bond being always an exothermic step accompanied by a very large release of free energy (final step on the RS(111) and ZB(100/110) surfaces). This indicates that N$_2$ cleavage is not the PDS for ammonia formation on these nitrides. The large change in free energy, being the most exergonic step, can be attributed to the large dissociative adsorption energy of nitrogen on these surfaces. This is related to high stability of N-adatoms on this site and might facilitate N$_2$ splitting and replenishment of dimer-vacancy, from the thermochemical point of view. However, kinetics evaluations of this remain crucial to ensure probability of such dissociation and durability of the catalytic cycle and that will be addressed in forthcoming subsection.

The PDS and the measure of the catalytic activity towards NH$_3$ formation on each nitride is identified as the elementary reaction step with the largest increase in free energy (FIG. 9, double-ended arrows). When this elementary step can be eliminated by applying a bias, it is referred to as the onset potential, which is the bias that needs to be applied in order to shift the free energy landscape in such a way that all reaction steps become downhill in free energy. All the bias reported further on in this paper is versus standard hydrogen electrode (SHE). According to FIG. 9 for the (100) facets of RS structure of VN, the PDS is the first protonation step ($^A$NH), with $\Delta G_{PDS}$=+0.51 eV. Thus, by applying an external bias of −0.51 V, this increase in free energy can be eliminated and all electrochemical steps will then be downhill in free energy. For the RS(111) of VN, the PDS is to form the first ammonia molecule ($^A$NH$_3$) and it is +0.85 eV endothermic. A bias of −0.85 V will be required to overcome this thermochemical barrier and help the reaction proceed. For the ZB(100) and (110), the PDS is the formation of second ammonia molecule ($^B$NH$_3$), which is even more uphill in free energy with +1.22 eV and +1.24 eV, respectively, requiring lower over-potentials to ensure the reaction. It is also seen that ammonia adsorbs differently on these different facets of VN. The adsorption energy of the first and second ammonia is calculated to be +0.27 and −0.44 eV on the RS(100), +0.85 and +0.54 eV on the RS(111), −0.39 and +1.24 eV on the ZB(110), +0.96 and +1.22 eV on the ZB(100) surfaces of VN. Therefore, it is more likely to form and adsorb NH$_3$ on the RS(100). NH$_3$ desorption, on the other hand, is always exothermic on (100/111) of RS and (100) of ZB. But on the ZB(110), desorption of second NH$_3$ is +0.24 eV endergonic. However in reality, the adsorbed NH$_3$ is likely to get further protonated to NH$_4^+$ and released into the solution, thereby avoiding this small increase in free energy.

Possibility of Filling N-Vacancy and Endurance of Catalytic Cycle

To obtain a nonstop catalytic circle, the N-vacancy left behind after releasing the ammonia molecule(s) needs to be replenished by N$_{2(g)}$ injected into the system. The two variants of the MVK mechanism (single- and dimer-vacancy) require slightly different considerations for filling the vacancy. For the dimer-vacancy MVK mechanism, the di-nitrogen is expected to simply dissociate into the two vacancies, whereas, for the single-vacancy MVK mechanism there are two possibilities explored herein. The first possibility is to fill the single-vacancy dissociatively. For this to happen, the crucial factor is dissociation of di-nitrogen on the vacancy where one N-adatom fills single-vacancy, the other binds neighboring metal atom and then protonated to form the second ammonia molecule and complete the catalytic cycle. The second possibility is to fill the single-vacancy associatively where $N_{2(g)}$ binds the single-vacancy and then the outermost N gets protonated to form second ammonia molecule and complete the catalytic cycle. For the associative filling of the vacancy, the energy profile is constructed purely by considering the energies of the stable intermediates. However, for the dissociative filling of either single- or dimer-vacancy, the kinetic barrier of splitting $N_2$ is considered, as N≡N dissociation is known to exhibit large barriers on many surfaces[31,33].

Figure 10B:
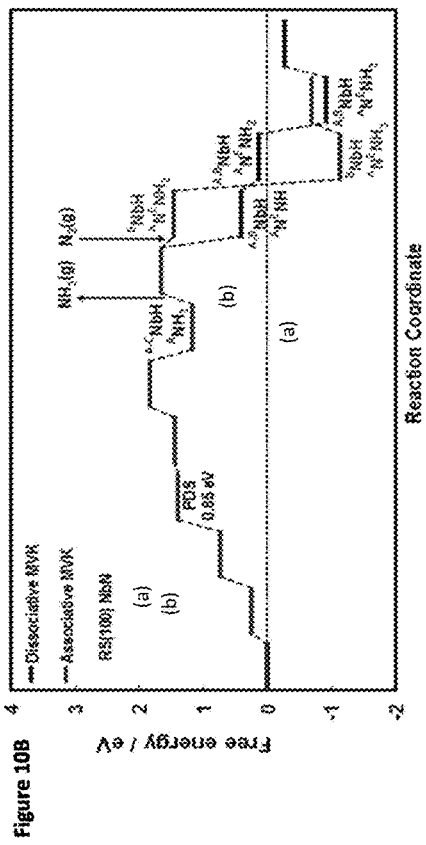
Figure 10D:
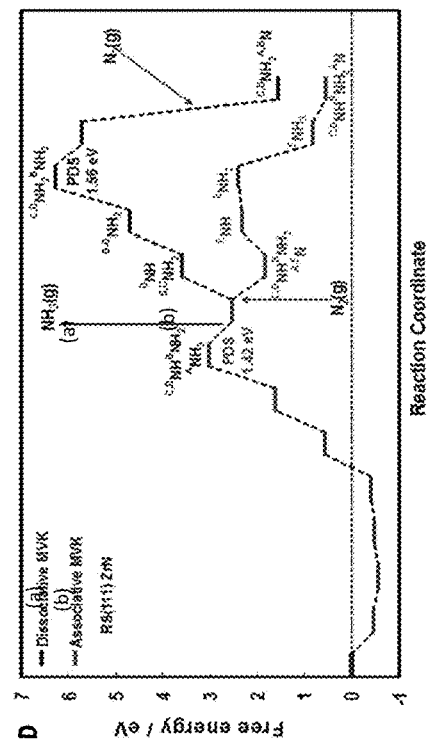
Figure 10A:
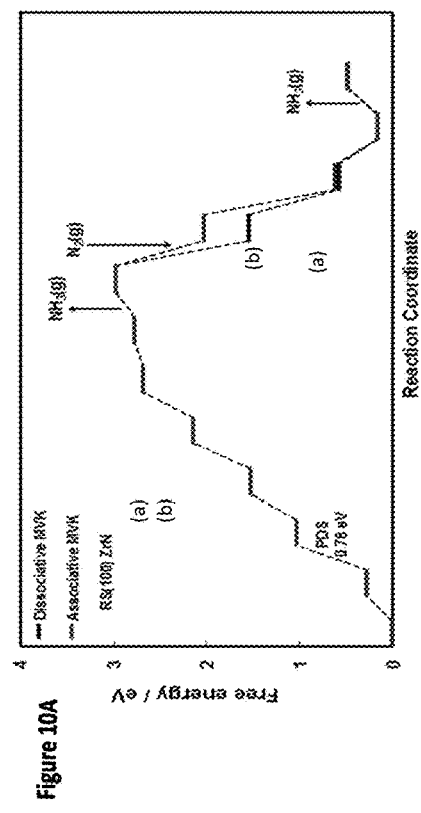
Figure 10C:
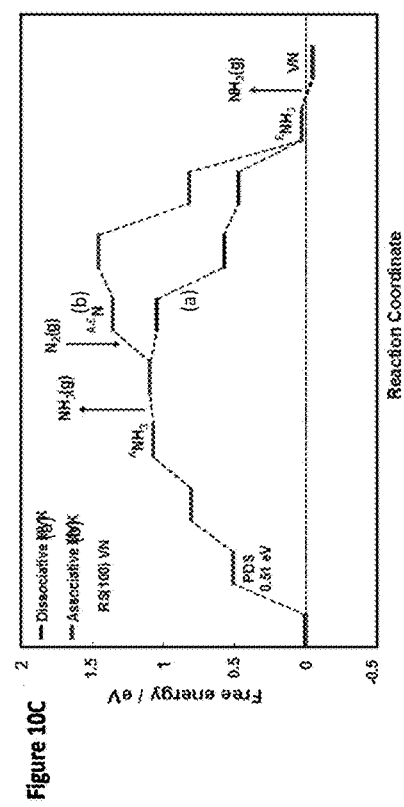

According to thermochemical (FIG. 2 and Figure E2) and kinetics (FIG. 3) studies carried out on all of these surfaces, it was found that all the RS(100) nitrides, all the ZB(110) surfaces except for VN, the RS(111) and the ZB(100) of CrN reduce nitrogen to ammonia through a dissociative MVK mechanism while the RS(111) of ZrN, NbN, VN as well as the ZB(100/110) of VN do it more favorably via associative MVK. Generally, four different behaviors observed from comparison of these different possible mechanisms that is mentioned below and shown in FIG. 10 for four of the surfaces. Other surfaces follow more or less the same pattern. i) Both mechanisms seem operable at ambient conditions with similar PDS, formation of similar species at each corresponding step and similar number of proton-electron pair (FIG. 10A). ii) Both mechanisms seem operable with similar PDS but with different species and different number of proton-electron pair (FIG. 10B). iii) One mechanism is more favorable than the other due to larger free energy change attributed to the step regarding filling vacancy (FIG. 10C). iv) One of the mechanisms is slowed down due to slightly high barrier of $N_2$ splitting and less favorable due to higher PDS, similar number of proton-electron pair but different species formed at each corresponding step (FIG. 10D).

DFT calculations show that filling single-vacancy on the RS(100) of ZrN (FIG. 2A) is −0.95 eV downhill in free energy on associative path but −1.44 eV on dissociative. So from thermochemical perspective, it is more favorable for this surface to form ammonia via dissociative single-vacancy. The feasibility of $N_2$ dissociation is then studied from kinetics perspective. The MEP for $N_2$ dissociation on the N-vacancy is calculated by CI-NEB method and presented in FIG. 11. The accompanying barrier of $N_2$ splitting was found very small on ZrN (0.11 eV) and hence not limiting the reaction at ambient conditions. For the RS(100) of NbN (FIG. 10B), it is −0.20 eV exothermic to fill the N-vacancy via associative path where two neighboring Hs migrate to bind the outermost N-adatom on vacancy ($^E$N) and form $^E$NH$_2$. Whilst, it is −1.26 eV downhill in free energy to fill the N-vacancy dissociatively where one of the neighboring Hs migrates to $^E$N and forms $^E$NH. Thus, it should be more favorable for the reaction to go through dissociative path and formation of $^E$NH rather than $^E$NH$_2$. The activation energy calculated for splitting of $N_2$ on NbN and filling the single-vacancy is 0.35 eV, which should not be problematic at ambient conditions. For VN (FIG. 10C), step regarding filling single-vacancy that is −0.05 eV downhill in free energy when filled dissociatively becomes +0.26 eV uphill if filled associatively. Its following step (protonation of N-adatom) also changes from being −0.49 eV exergonic to +0.10 eV endergonic. Although these thermochemical barriers are very small to circumvent at ambient conditions, the dissociative path should be more favorable as activation barrier of $N_2$ splitting to replenish the N-vacancy on this surface is also calculated being low (0.30 eV). As shown in our previous work, a dimer-vacancy MVK mechanism was found favorable for the RS(100) of CrN. The kinetics analysis of its vacancy replenishment is carried out here in this study and the related barrier of $N_2$ splitting is 0.17 eV if reaction proceeds via dissociative dimer-vacancy. Besides, there will be a PDS of 0.85 eV to fill the N-vacancy associatively. This cannot be met by applying bias, as there is no proton-electron pair is transferred at this step. Hence, dissociative MVK should be much faster than the associative MVK on this surface of CrN.

According to thermochemical (FIG. 10) and kinetics (FIG. 11) studies for RS(100) candidates, it should be fast and easy to replenish the N-vacancy and sustain catalytic circle through dissociative single-vacancy MVK (for ZrN, NbN and VN) and dimer-vacancy MVK (for CrN). We believe that rapid cleavage of $N_2$ and facile replenishment of N-vacancy can be attributed to: (i) the existence of N-vacancy site on these surfaces that activates the highly inert $N_2$ and (ii) most importantly the high affinity of these nitrides (specifically the central transition metal atoms) to nitrogen acting as a driving force for dissociative adsorption of $N_2$. However, negative potentials of at least 0.51 to 0.76 V are necessary to drive the reduction towards the formation of ammonia.

Considering the RS(111) surfaces, associative MVK should be more dominant for ammonia formation on ZrN, NbN and VN. The PDS for ZrN is 1.42 eV via associative MVK but 1.56 eV via dissociative. Besides, the step after releasing first ammonia on ZrN is +1.05 eV endergonic to protonate surface N via dissociative path plus a small kinetic barrier of 0.18 eV for $N_2$ dissociation on dimer-vacancy (FIG. 11). While, it is −0.70 eV exergonic if reaction goes through associative path and adsorbs $N_2$ in the vacancy (FIG. 10D). So, the former should be more favorable at ambient conditions. On the surface of NbN, likewise, associative mechanism might favor ammonia formation, as it is −0.23 eV more exothermic to adsorb $N_2$ on the surface ($^{A,E}$N) rather than continuous protonation of surface N and formation of second $NH_3$ via dissociative path. There is also a barrier of 0.45 eV for splitting $N_2$ on dimer-vacancy if reaction proceeds dissociatively. For CrN, associative MVK should be slow at ambient conditions, as the step related to filling vacancy becomes the PDS ($\Delta G_{PDS}$=0.77 eV), which cannot be tuned by external bias. While, via dissociative path surface N protonation becomes the PDS and bias-tunable step ($\Delta G_{PDS}$=0.71 eV). The barrier of $N_2$ splitting is, however, 0.52 eV that might slow down the reaction even further in dissociative path. For VN, on one hand, it is +0.24 eV more endothermic to go through associative MVK and fill the vacancy with $N_2$ ($^{A,E}$N) than to go via dissociative MVK and continue protonation of the surface N ($^B$NH$_2$). On the other hand, if the reaction goes via dissociative MVK, there is a large barrier of around 1.15 eV to split $N_2$ and fill dimer-vacancy. Hence despite a 0.24 eV higher PDS, it seems much easier and faster for the reaction to drive through associative path avoiding such large splitting barrier.

Considering the ZB(100) family, associative MVK was found inactive on CrN due to instability of $N_2$-admolecule in vacancy and dissociative MVK should be the most favorable route to ammonia formation. For VN, lower PDS was found via associative mechanism on first ammonia formation (0.97 eV, $^A$NH$_3$). Via dissociative path, the PDS is 1.22 eV on second ammonia formation ($^B$NH$_3$). Besides, a large barrier for $N_2$ splitting on vacancy was found to be 1.57 eV. Thus, associative path should be the dominant mechanism for this nitride. On the ZB(110) of ZrN and NbN, both mechanisms are equally viable especially on NbN where there is only a tiny barrier of 0.04 eV to split $N_2$ on vacancy easily surmountable at ambient conditions. Nonetheless, on ZrN dissociative reaction might be a bit slower due to a barrier of 0.46 eV for splitting. On CrN, the PDS of the reaction is 0.76 eV ($^A$N$^E$NH) if the reaction proceeds via associative MVK but it decreases to 0.54 eV ($^A$CrH$^{A,B}$NH) when it goes via dissociative MVK. On VN, ammonia formation is faster via associative MVK with a PDS of 1.06 eV. Dissociatively, the PDS is 1.24 eV plus a small barrier of 0.21 eV for nitrogen splitting.

The free energy change of the PDS of each facet of the nitride candidates shown in FIG. 12 is based on the most favourable reaction mechanism explained above. Most of the facets exhibit relatively high activity towards ammonia formation. Concerning the PDS of the reaction, there is no clear trend observed for these nitrides. For the RS(100) facets of ZrN, NbN and VN, first protonation of the surface N is the PDS. While for some it is the formation of ammonia molecule which is the PDS (i.e. RS(111) of ZrN and VN as well as ZB(100) of VN). The result of these catalytic investigations indicates that dissociation of di-nitrogen is not the PDS on any of the presented surfaces. Thus, we conclude that nitride catalysts are capable of shifting the bottleneck of ammonia synthesis from $N_2$ cleavage to the subsequent formation of nitrogen-hydrogen species (*NH, *NH$_2$, or *NH$_3$) due to which simpler but yet higher rate of ammonia formation is anticipated.

Another new finding of the current study according to FIG. 12 is that alongside the promising (100) facets of VN introduced previously, the (110) facets of ZB structure of CrN and NbN seem to be very active towards ammonia formation compared to the other RS and ZB counterparts. Considering the best catalyst being the one with $\Delta G_{PDS}$<1.0 eV, the activity of these nitrides decreases as following: RS(100) of VN, ZB(110) of CrN and NbN with 0.51-0.59>RS(100) of NbN with 0.65>RS(111) of CrN, RS(100) of CrN and ZrN with 0.71-0.76>RS(111) of VN with 0.85>ZB(100) of VN with 0.97>ZB(110) of ZrN and VN with 1.02-1.06>ZB(100) of CrN with 1.11>RS(111) of ZrN with 1.42 eV. If these 4 categories are compared together based on the texture orientation of the facets, the most active orientation for RS(100), RS(111), ZB(100) and ZB(110) is VN, CrN, VN and CrN, respectively. So from activity point of view, VN and CrN catalysts seem the most promising candidates for electrochemical ammonia formation because reactivity is superior on more than a facets compared to other nitrides studied here. Considering the higher faradaic efficiency gained due to lower proton-electron paired required to transfer for 2NH$_3$ formation, the RS(100) of VN and CrN should be the best, too, as they complete the catalytic cycle with the minimum being 6(H$^+$+e$^-$).

Another interesting observation is that the most favorable H adsorption site for the (111) facet is the surface N with no tendency on binding of H to neighbouring metal atom(s) even at high coverage. While on other facets, H adsorption is usually seen on neighbouring metal atom(s) at low coverage to be the lowest energy configuration. This means that on (111) all added protons bind only strongly to the surface N and it is not possible to make the first ammonia molecule without initially populating all surface Ns and formation of 4NH ($^{A-D}$NH) plus one or two NH$_2$ ($^{A,B}$NH$_2$). Whereas, on the other nitrides' facets there is almost always one or two neighbouring metal atom(s) that is protonated alongside surface N triggering more coverage and obviously demanding more than 6(H$^+$+e$^-$) to complete the catalytic cycle of 2NH$_3$. This different behaviour might be due to compact crystallography of RS(111) and kind of protruded surface N atoms from the surface. This might reduce the steric hindrance and make surface Ns more exposed to protons compared to the neighbouring metal atoms. Another difference observed is that almost wherever neighbouring metal atom(s) is/are protonated alongside with surface nitrogen, it slightly lowers the free energy of the PDS. As shown in the previous work (Example 1), due to proton population on neighbouring metal atom(s) and coverage effect developed in moving from the constrained to the unconstrained mechanism, the $\Delta G_{PDS}$ was lowered by up to 0.3 eV. This might partially explain the former observation regarding higher $\Delta G_{PDS}$ on (111) where such coverage is missing. The only exception is, however, VN as metal protonation is never the lowest energy configuration on none of its facets and it is always the surface N that adsorbs protons strongly.

Stability of Vacancy on Surface

In the MVK mechanism, a surface nitrogen atom is reduced to form NH$_3$ due to which a N-vacancy is left behind. Then as shown earlier, a gaseous $N_2$ molecule replenishes the resulting N-vacancy only if it is stable at the surface. Otherwise, the reacted nitrogen on the surface is replaced with more nitrogen from the catalyst itself rather than with gaseous $N_2$ (migration of the N-vacancy into the bulk). This process can, in principle, continue until all the nitrogen atoms of the metal nitride have reacted and formed NH$_3$, leaving only the pure metal. The stability of the N-vacancy at the surface of the catalyst is estimated by comparing the difference in energy of a nitride slab with a N-vacancy in the surface layer ($E_{vac,1}$) and to that of a N-vacancy in the first subsurface layer ($E_{vac,2}$). The minimum energy configuration of each of these slabs is found and the energy difference ($\Delta E_{vac}=E_{vac,2}-E_{vac,1}$) used as an estimation of the thermodynamic stability of the vacancy at the surface of the nitride. Activation barriers for vacancy migration ($E_{a,vac}$) are also calculated and both $\Delta E_{vac}$ and $E_{a,vac}$ are presented in FIG. 13. Except for the RS(111) of ZrN, ZB(110) of CrN, as well as ZB(100) of CrN and VN, it is thermodynamically favorable for the vacancy to migrate to the bulk, with $\Delta E_{vac}$ less than or close to zero. However, it is clear that many of the considered nitrides exhibit a high activation barrier for vacancy migration and are thus expected to demonstrate a stable N-vacancy on the surface. Attention should be paid to the ZB(110) of NbN regarding possible migration of vacancy into the bulk as there is neither high thermochemical nor kinetics barrier to avoid it. Therefore, despite very high activity of this nitride towards NRR, it might be impossible to replenish its N-vacancy with $N_{2(g)}$ if it migrates to the bulk. Considering the thermodynamics of the reaction and higher activation barrier of migration for the ZB(110) of VN, the stability of vacancy on the surface might be still secured to some extent as the kinetics barrier of 0.51 eV might slow down its migration at ambient conditions. Extra precaution is needed when the polycrystalline films of nitrides is used in electrochemical setup. Because upon migration of vacancy into the bulk in one specific facet it is not unlikely that other facets, even with stable vacancy on the surface, start leaking out. That will result in reduction of all the N contents of the nitride without replenishment of vacancy, ceasing the catalytic cycle and transforming the nitride catalyst into pure metal.

REFERENCES

31. Skúlason, E. et al. A theoretical evaluation of possible transition metal electro-catalysts for $N_2$ reduction. *Phys. Chem. Chem. Phys.* 14, 1235-1245 (2012).

33. Howalt, J. G. & Vegge, T. Electrochemical ammonia production on molybdenum nitride nanoclusters. *Phys. Chem. Chem. Phys.* 15, 20957-20965 (2013).
42. Hammer, B. Hansen, L. & Nørskov, J. Improved adsorption energetics within density-functional theory using revised Perdew-Burke-Ernzerhof functionals. *Phys. Rev. B* 59, 7413-7421 (1999).
43. Blöchl, P. Projector augmented-wave method. *Phys. Rev. B* 50, 17953-17979 (1994).
44. Kresse, G. & Hafner, J. Ab initio molecular dynamics for liquid metals. *Phys. Rev. B* 47, 558-561 (1993).
45. Kresse, G. & Hafner, J. Ab initio molecular-dynamics simulation of the liquid-metal-amorphous-semiconductor transition in germanium. *Phys. Rev. B* 49, 14251-14269 (1994).
46. Kresse, G. & Furthmüller, J. Efficiency of ab-initio total energy calculations for metals and semiconductors using a plane-wave basis set. *Comput. Mater. Sci.* 6, 15-50 (1996).
47. Kresse, G. & Furthmüller, J. Efficient iterative schemes for ab initio total-energy calculations using a plane-wave basis set. *Phys. Rev. B. Condens. Matter* 54, 11169-11186 (1996).
48. Henkelman, G., Uberuaga, B. P. & Jónsson, H. A climbing image nudged elastic band method for finding saddle points and minimum energy paths. *J. Chem. Phys.* 113, 9901-9904 (2000).
49. Henkelman, G. & Jónsson, H. Improved tangent estimate in the nudged elastic band method for finding minimum energy paths and saddle points. *J. Chem. Phys.* 113, 9978-9985 (2000).
50. Hlynsson, V. F., Skúlason, E. & Garden, A. L. A systematic, first-principles study of the structural preference and magnetic properties of mononitrides of the d-block metals. *J. Alloys Compd.* 603, 172-179 (2014).
51. Nørskov, J. K. et al. Origin of the overpotential for oxygen reduction at a fuel-cell cathode. *J. Phys. Chem. B* 108, 17886-17892 (2004).
52. Atkins, P. W. *Physical Chemistry.* C9-C14 (1994).

The invention claimed is:

1. A process for producing ammonia comprising:
    feeding gaseous nitrogen to an electrolytic cell, where it comes in contact with a cathode electrode surface, wherein said surface has a catalyst surface comprising a nitride catalyst, said electrolytic cell comprising a proton donor;
    running a current through said electrolytic cell, whereby nitrogen reacts with protons to form ammonia.
2. The process of claim 1, wherein said nitride catalyst comprises one or more nitride selected from the group consisting of Scandium nitride, Titanium nitride, Vanadium nitride, Chromium nitride, Mangan nitride, Copper nitride, Yttrium nitride, Zirconium nitride, Niobium nitride, Molybdenum nitride, Silver nitride, Hafnium nitride, Tantalum nitride, Iron nitride, Cobalt nitride, Nickel nitride, Ruthenium nitride, Rhodium nitride, Palladium nitride, Osmium nitride and Iridium nitride.
3. The process of claim 1, wherein the nitride catalyst comprises one or more nitride selected from the group consisting of Vanadium nitride, Zirconium nitride, Chromium nitride and Niobium nitride.
4. The process of claim 1, wherein the catalyst surface comprises a surface selected from rocksalt (RS) and zincblende (ZB) surfaces.
5. The process of claim 1, wherein the catalyst surface has a facet selected from the group consisting of (100) facet, (110) facet and (111) facet.
6. The process of claim 1, wherein the catalyst surface has a surface selected from RS (100) facet, RS (111) facet, ZB (100) facet, and ZB (110) facet.
7. The process of claim 1, wherein ammonia is formed at an electrode potential at less than about −0.8 V.
8. The process of claim 1, wherein less than 20% moles $H_2$ are formed compared to moles $NH_3$ formed.
9. The process of claim 1, wherein said electrolytic cell comprises one or more aqueous electrolytic solution.
10. The process of claim 1, wherein ammonia is formed at an electrode potential at less than about −0.6 V.
11. The process of claim 1, wherein less than 10% moles $H_2$ are formed compared to moles $NH_3$ formed.
12. The process of claim 1, wherein less than 5% moles $H_2$ are formed compared to moles $NH_3$ formed.
13. A process for removing $NO_x$ and/or $SO_x$ gas from a stream of gas, the method comprising steps of:
    (a) generating ammonia in situ by a process according to claim 1;
    (b) reacting the ammonia thus produced with the stream of gas; whereby ammonia reacts with the $NO_x$ and/or the $SO_x$ in the stream of gas.
14. The process of claim 13, wherein the stream of gas is an engine exhaust, an automobile engine exhaust.
15. A system for generating ammonia comprising an electrochemical cell with a cathode electrode surface having a catalytic surface, said surface charged with a catalyst comprising one or more nitride selected from the group consisting of Scandium nitride, Titanium nitride, Vanadium nitride, Chromium nitride, Mangan nitride, Copper nitride, Yttrium nitride, Zirconium nitride, Niobium nitride, Molybdenum nitride, Silver nitride, Hafnium nitride, Tantalum nitride, Iron nitride, Cobalt nitride, Nickel nitride, Ruthenium nitride, Rhodium nitride, Palladium nitride, Osmium nitride and Iridium nitride.
16. The system of claim 15, wherein the nitride is selected from Vanadium nitride, Zirconium nitride, Chromium nitride and Niobium nitride.
17. The system of claim 15, wherein the catalyst surface comprises a surface selected from rocksalt (RS) and zincblende (ZB) surfaces.
18. The system of claim 15, wherein catalyst surface comprises a surface selected from RS (100) facet, RS (111) facet, ZB (100) facet, and ZB (110) facet.
19. The system of claim 15, wherein said electrolytic cell further comprises one or more electrolytic solution.

* * * * *